US012581536B2

(12) United States Patent
Singh et al.

(10) Patent No.: US 12,581,536 B2
(45) Date of Patent: Mar. 17, 2026

(54) COT/FFP SCHEDULING IN UNLICENSED SPECTRUM

(71) Applicant: Telefonaktiebolaget LM Ericsson (PUBL), Stockholm (SE)

(72) Inventors: Bikramjit Singh, Raasepori (FI); Alexey Shapin, Luleå (SE); Reem Karaki, Aachen (DE); Sorour Falahati, Stockholm (SE); Mai-Anh Phan, Herzogenrath (DE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 476 days.

(21) Appl. No.: 17/919,808

(22) PCT Filed: Apr. 23, 2021

(86) PCT No.: PCT/IB2021/053385
    § 371 (c)(1),
    (2) Date: Oct. 19, 2022

(87) PCT Pub. No.: WO2021/214730
    PCT Pub. Date: Oct. 28, 2021

(65) Prior Publication Data
    US 2023/0189338 A1      Jun. 15, 2023

Related U.S. Application Data

(60) Provisional application No. 63/014,209, filed on Apr. 23, 2020.

(51) Int. Cl.
    *H04W 74/0816*          (2024.01)
(52) U.S. Cl.
    CPC .............................. *H04W 74/0816* (2013.01)

(58) Field of Classification Search
    CPC ................................................ H04W 74/0816
    See application file for complete search history.

(56) References Cited

U.S. PATENT DOCUMENTS

2017/0318607 A1    11/2017  Tiirola et al.
2020/0037354 A1     1/2020  Li et al.
                   (Continued)

FOREIGN PATENT DOCUMENTS

CN        107079494 A      8/2017
WO        2020 027533 A1   2/2020

OTHER PUBLICATIONS

OPPO, "Discussion on the remaining issues of configured grant enhancements", 3GPP TSG RAN WG1 #100-E, Athens, Greece, Feb. 24-28, 2020, R1-2000473 (Year: 2020).*
                   (Continued)

*Primary Examiner* — Joseph A Bednash
(74) *Attorney, Agent, or Firm* — Baker Botts L.L.P.

(57) ABSTRACT

According to some embodiments, a method is performed by a wireless device for operation with shared spectrum channel access, wherein a first plurality of fixed frame periods (FFPs) are associated with the wireless device and a second plurality of fixed frame periods (FFPs) are associated with a network node and wherein each FFP comprises an idle period with no transmission and a channel occupancy time (COT) for potential transmission. The method comprises initiating a COT in one of the FFPs of the first plurality of FFPs and upon successful initiation of the COT, transmitting uplink data from the beginning of the COT.

26 Claims, 18 Drawing Sheets

— Planned data transmissions by gNB and UE

— FBE mode with only gNB as COT initiator may lead to delayed transmissions

— FBE mode with gNB and UE as COT initiator with aligned FFPs

(56) References Cited

U.S. PATENT DOCUMENTS

| | | | | |
|---|---|---|---|---|
| 2021/0195643 A1* | 6/2021 | Talarico | ............ | H04W 74/0816 |
| 2023/0078723 A1* | 3/2023 | Kim | ................. | H04W 74/0816 |
| | | | | 370/329 |
| 2023/0354275 A1* | 11/2023 | Moon | ............... | H04W 74/0808 |

OTHER PUBLICATIONS

Vivo, "PUSCH enhancements for URLLC", 3GPP TSG RAN WG1 #98bis, Chongqing, China, Oct. 14-20, 2019, R1-1910223 (Year: 2019).*

Nokia, Nokia Shanghai Bell (Moderator) 3GPP TSG RAN Meeting #86, Sitges, Spain, Dec. 9-12, 2019, RP-192923 (Year: 2019).*

Huawei, HiSilicon, Sia, 3GPP TSG RAN WG1 Meeting #98bis, Chongqing, China, Oct. 14-20, 2019, R1-1910068 (Year: 2019).*

3GPP TSG RAN WG1 Meeting #96; Athens, Greece; Source: Huawei, HiSilicon; Title: Coexistence and channel access for NR unlicensed band operations (R1-1901525)—Feb. 25-Mar. 1, 2019.

PCT International Search Report issued for International application No. PCT/IB2021/053385—Aug. 6, 2021.

PCT Written Opinion of the Internationa Lsearching Authority issued for International application No. PCT/IB2021/053385—Aug. 6, 2021.

3GPP TSG RAN WG1 Meeting #96bis; Xi'an, China, Apr. 8-12, 2019; Agenda Item: 7.2.2.2.1; Source: Huawei, HiSilicon; Title: Coexistence and channel access for NR unlicensed band operations (R1-1903928).

Search Report issued for Chinese Patent Application No. 2021800448942—May 14, 2025.

Office Action issued for Chinese Patent Application No. 202180044894.2—May 15, 2025.

* cited by examiner

1100

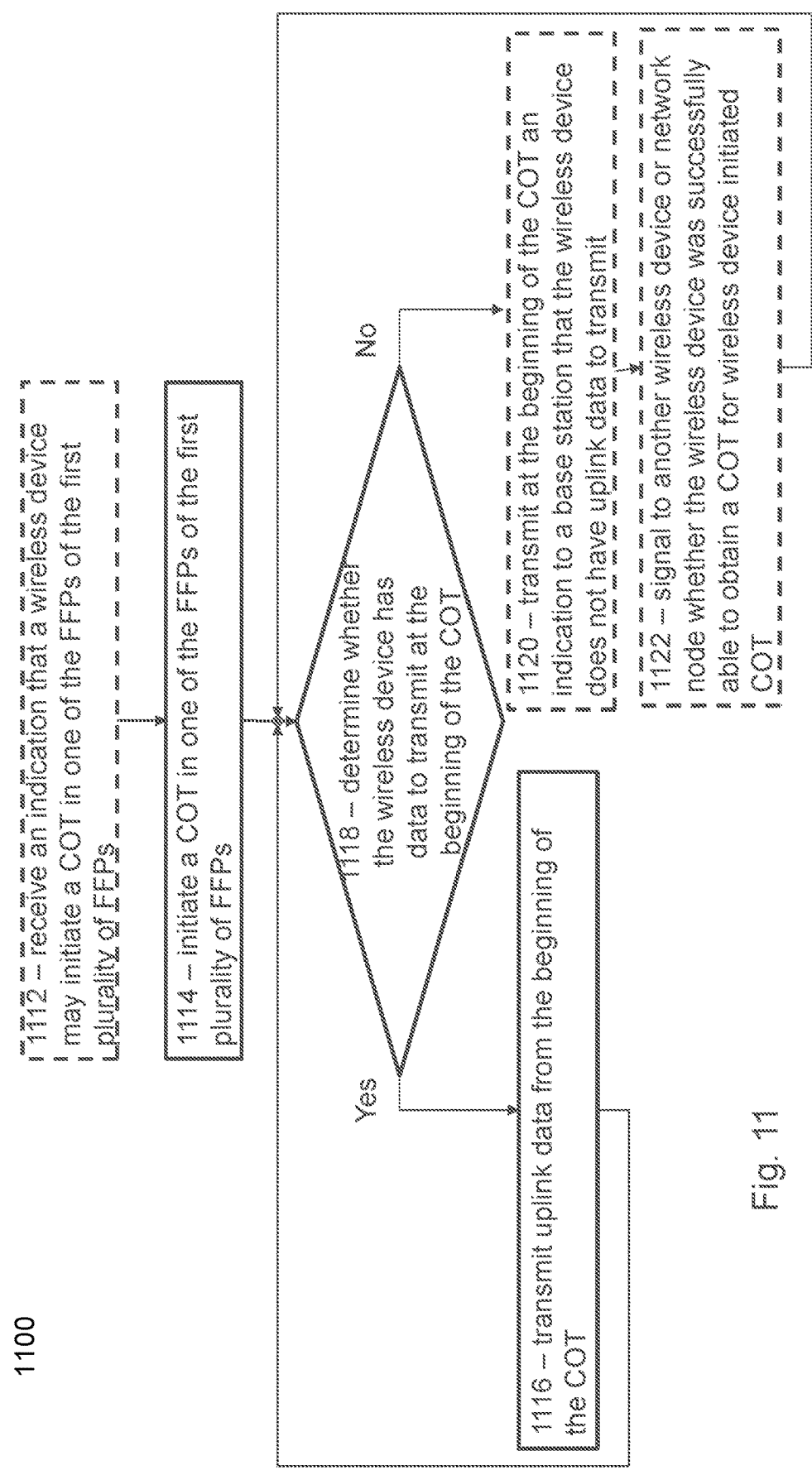

1112 – receive an indication that a wireless device may initiate a COT in one of the FFPs of the first plurality of FFPs 1114 – initiate a COT in one of the FFPs of the first plurality of FFPs 1118 – determine whether the wireless device has data to transmit at the beginning of the COT Yes No 1116 – transmit uplink data from the beginning of the COT 1120 – transmit at the beginning of the COT an indication to a base station that the wireless device does not have uplink data to transmit 1122 – signal to another wireless device or network node whether the wireless device was successfully able to obtain a COT for wireless device initiated COT

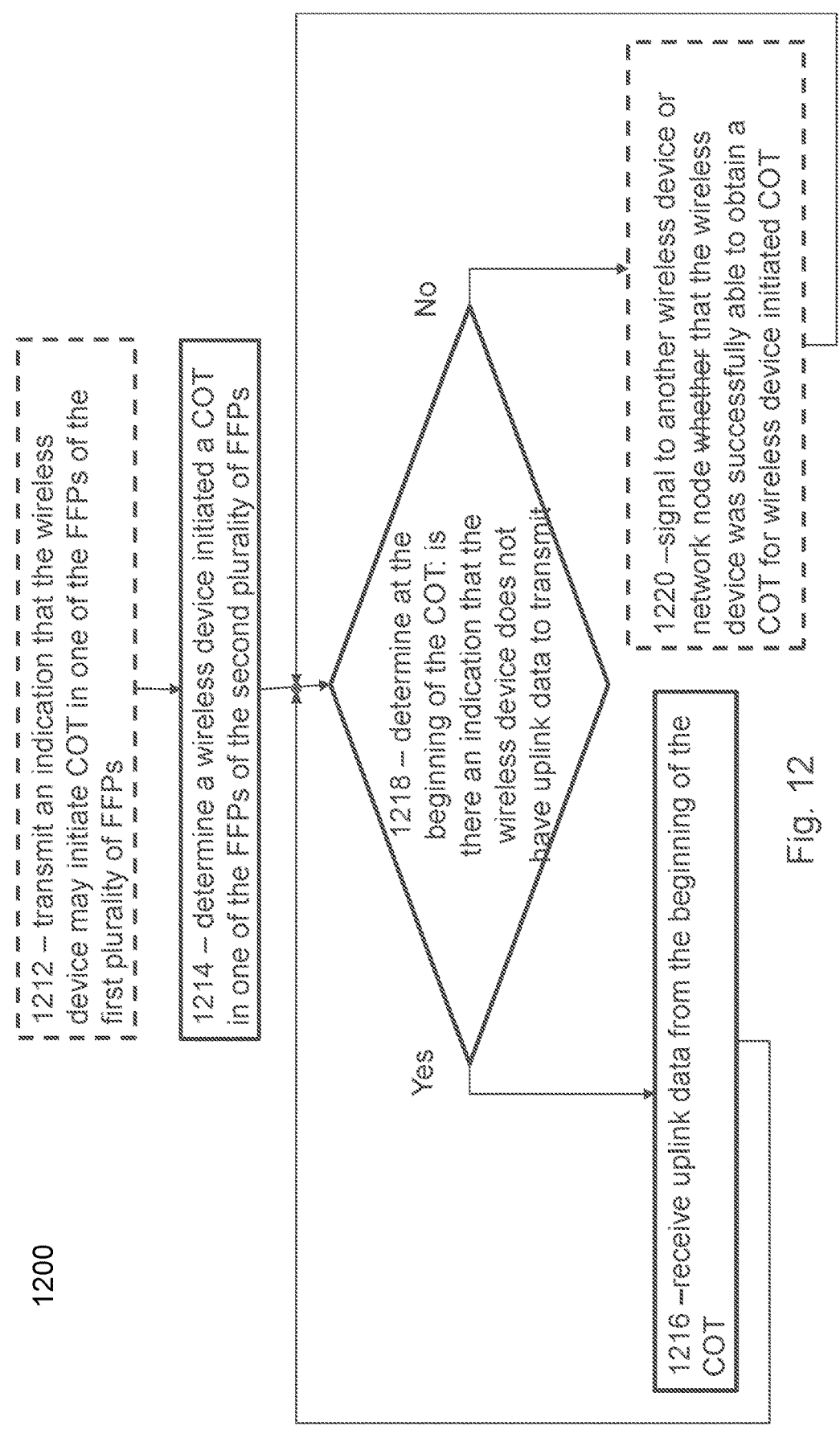

1212 – transmit an indication that the wireless device may initiate COT in one of the FFPs of the first plurality of FFPs 1214 – determine a wireless device initiated a COT in one of the FFPs of the second plurality of FFPs 1218 – determine at the beginning of the COT: is there an indication that the wireless device does not have uplink data to transmit No Yes 1220 – signal to another wireless device or network node whether that the wireless device was successfully able to obtain a COT for wireless device initiated COT 1216 – receive uplink data from the beginning of the COT

Fig. 12

1700
Network Node

1702
Receiving Module

1704
Determining Module

1706
Transmitting Module

1600
Wireless Device

1602
Receiving Module

1604
Determining Module

1606
Transmitting Module

710
Host computer provides user data

720
Host computer initiates transmission carrying the user data to the UE

730
UE receives the user data

611
Host computer executes client application

610
Host computer provides user data

620
Host computer initiates transmission carrying the user data to the UE

630
Base station transmits the user data

640
UE executes client application

COT/FFP SCHEDULING IN UNLICENSED SPECTRUM

PRIORITY

This nonprovisional application is a U.S. National Stage Filing under 35 U.S.C. § 371 of International Patent Application Serial No. PCT/IB2021/053385 filed Apr. 23, 2021 and entitled "COT/FFP SCHEDULING IN UNLICENSED SPECTRUM" which claims priority to U.S. Provisional Patent Application No. 63/014,209 filed Apr. 23, 2020 both of which are hereby incorporated by reference in their entirety.

TECHNICAL FIELD

Embodiments of the present disclosure are directed to wireless communications and, more particularly, to channel occupancy time (COT)/fixed frame period (FFP) scheduling in unlicensed spectrum.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Ultra-reliable and low latency communication (URLLC) is one of the main use cases of fifth generation (5G) now radio (NR). URLLC has strict requirements on transmission reliability and latency, i.e., 99.9999% reliability within 1 ms one-way latency. NR Rel-15 includes several new features and enhancements to support these requirements. Rel-16 standardization works are focused on further enhancing URLLC system performance as well as ensuring reliable and efficient coexistence of URLLC and other NR use cases. One example scenario is when both enhanced mobile broadband (eMBB) and URLLC user equipment (UEs) co-exist in the same cell. Two main approaches exist to support multiplexing/prioritization.

In addition to operation in licensed bands, NR includes operation in unlicensed bands, i.e., NR-unlicensed (NR-U). Allowing unlicensed networks, i.e., networks that operate in unlicensed or shared spectrum, to effectively use the available spectrum is an attractive approach to increase system capacity. For convenience, unlicensed spectrum herein may refer to both unlicensed and shared spectrum.

Although unlicensed spectrum does not match the qualities of the licensed regime, solutions that allow an efficient use of it as a complement to licensed deployments have the potential to bring great value to network operators, and, ultimately, to the wireless industry as a whole. Some features in NR need to be adapted to comply with the special characteristics of the unlicensed band as well as different regulations. Further, a UE intended to use unlicensed spectrum may employ clear channel assessment (CCA) schemes to find out whether the channel is free over a certain period.

One such technique is listen-before-talk (LBT). There are different flavors of LBT depending on which channel access mode the device uses and which type of data it wants to transmit in the upcoming transmission opportunity, referred to as channel occupancy time (COT). Common for all flavors is that the sensing is done in a particular channel (corresponding to a defined carrier frequency) and over a predefined bandwidth. Further, two modes of access operations are defined-frame-based equipment (FBE) and load-based equipment (LBE). In FBE mode, the sensing period is simple, while the sensing scheme in LBE mode is more complex.

FBE includes semi-static channel occupancy. An example is illustrated in FIG. 1.

FIG. 1 is a timing diagram illustrating an example FBE procedure depicting Third Generation Partnership Project (3GPP) semi-static channel occupancy [ETSI harmonized standard EN 301 893 Section 4.2.7.3.1]. In FBE mode as defined in 3GPP specifications and illustrated in FIG. 1, the gNB assigns fixed frame periods (FFPs), senses the channel for 9 us just before the FFP boundary, and if the channel is sensed to be free, it starts with a downlink transmission, and allocates resources among different UEs in the FFP. This procedure can be repeated with a certain periodicity.

In the FFP, downlink/uplink transmissions are only allowed within the COT, a subset of FFP resources, where the remaining idle period is reserved so that other nodes also have the chance to sense and use the channel. Thus in FBE operations, the channel is sensed at specific intervals just before the FFP boundary. The FFP can be set to values between 1 and 10 ms and can be changed after a minimum of 200 ms. The IDLE period is a regulatory requirement and is supposed to be at least $T_{IDLE} \geq \max(0.05*COT, 100 us)$. In 3GPP TS 37.213 this has been simplified to be $T_{IDLE} \geq \max(0.05*FFP, 100 us)$, i.e., the maximum channel occupancy time, MCOT, is defined as $T_{MCOT} = \min(0.95*FFP, FFP-0.1 ms)$. So for 10 ms FFP, the MCOT is 9.5 ms, while for 1 ms FFP the MCOT is 0.9 ms=0.9*FFP.

LBE includes dynamic channel occupancy. The default LBT mechanism for LBE operation, LBT category 4, is similar to existing Wi-Fi operation, where a node can sense the channel at any time and start transmitting if the channel is free after a deferral and back off period. For specific cases, e.g., shared COT, other LBT categories allowing a very short sensing period are allowed.

There are different wideband operation modes. The nodes perform LBT on a certain bandwidth referred to as the LBT channel, which are up to 20 MHz to comply with WiFi channels. The transmission bandwidth is therefore also limited by the LBT bandwidth. The channels can however be aggregated in wideband operation modes using either carrier aggregation, where LBT is performed separately on each carrier, or using one wideband carrier which is divided into several resource block sets, RB set (also referred to as LBT bandwidth or LBT subband), where LBT is performed on each RB-set.

There currently exist certain challenges. For example, for COT initiation in FBE mode, only gNB initiated COT is considered in 3GPP specifications, i.e., gNB transmits in the beginning of the COT, then UEs may transmit within the same COT (there may be multiple switching points between downlink and uplink within the same COT). This may cause some issues.

If a configured grant (CG) opportunity falls in the beginning of a COT, then a gNB-initiated COT procedure may collide with the CG opportunity in the time-domain. Using gNB-initiating COT as the only option may not be desirable for some latency-critical situations. For example, if an urgent URLLC request needs immediate allocation, and if there is an allocation opportunity that intersects with the IDLE period and/or the beginning of the COT, then the UE cannot use the (full) allocation because the UE has to wait for gNB-initiation procedure in the beginning of the next COT.

Thus, UE-initiated COT is a useful alternative, but supporting this feature imposes new challenges. One is physical uplink shared channel (PUSCH) segmentation. If a PUSCH is segmented over the time-period that spans over part of two FFPs, then its segmentation behavior may depend on type of initiation-gNB or UE based.

SUMMARY

As described above, certain challenges currently exist with channel occupancy time (COT)/fixed frame period (FFP) scheduling in unlicensed spectrum. Certain aspects of the present disclosure and their embodiments may provide solutions to these or other challenges. For example, some embodiments include flexible scheduling where COT behavior is not restricted to gNB-initiated COT. Some embodiments consider other initiation-types and combination of modes, e.g., LBE and FBE, for flexible scheduling for reliable and low latency applications.

According to some embodiments, a method is performed by a wireless device for operation with shared spectrum channel access, wherein a first plurality of FFPs are associated with the wireless device and a second plurality of FFPs are associated with a network node and wherein each FFP comprises an idle period with no transmission and a COT for potential transmission. The method comprises initiating a COT in one of the FFPs of the first plurality of FFPs and upon successful initiation of the COT, transmitting uplink data from the beginning of the COT.

In particular embodiments, the method further comprises receiving an indication that the wireless device may initiate a COT in one of the FFPs of the first plurality of FFPs.

In particular embodiments, the first plurality of FFPs and the second plurality of FFPs are not aligned in the time domain. Transmitting uplink data may comprise refraining from transmitting uplink data in an idle period of any of the FFPs of the second plurality of FFPs. Transmitting uplink data may comprise segmenting the uplink data into two or more segments and refraining from transmitting any of the two or more segments that overlap with an idle period of any of the FFPs of the second plurality of FFPs. Transmitting uplink data may comprise segmenting the uplink data into two or more segments and refraining from transmitting all of the two or more segments if any of the two or more segments overlap with an idle period of any of the FFPs of the second plurality of FFPs. Transmitting uplink data may comprise segmenting the uplink data into two or more segments and refraining from transmitting any of the two or more segments after one of the two or more segments overlap with an idle period of any of the FFPs of the second plurality of FFPs.

In particular embodiments, transmitting uplink data comprises segmenting the uplink data into two or more segments and one segment of the two or more segments includes an indication that the wireless device will transmit the next segment of the two or more segments using wireless device initiated COT in a next FFP of the first plurality of FFPs.

In particular embodiments, the method further comprises determining the wireless device does not have uplink data to transmit at the beginning of a COT and transmitting at the beginning of the COT an indication to a base station that the wireless device does not have uplink data to transmit.

In particular embodiments, the method further comprises signaling to another wireless device or network node whether the wireless device was successfully able to obtain a COT for wireless device initiated COT.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method is performed by a network node for operation with shared spectrum channel access, wherein a first plurality of FFPs are associated with a wireless device and a second plurality of FFPs are associated with the network node and wherein each FFP comprises an idle period with no transmission and a channel occupancy time (COT) for potential transmission. The method comprises determining a wireless device initiated a COT in one of the FFPs of the second plurality of FFPs and receiving uplink data from the beginning of the COT.

In particular embodiments, the method further comprises transmitting an indication that the wireless device may initiate COT in one of the FFPs of the first plurality of FFPs.

In particular embodiments, the first plurality of FFPs and the second plurality of FFPs are not aligned in the time domain and uplink data is not received in an idle period of any of the FFPs of the second plurality of FFPs. The uplink data may be segmented into two or more segments and segments that overlap with an idle period of any of the FFPs of the second plurality of FFPs are not received. The uplink data may be segmented into two or more segments and none of the two or more segments are received if any of the two or more segments overlap with an idle period of any of the FFPs of the second plurality of FFPs. The uplink data may be segmented into two or more segments and the segments are not received after one of the two or more segments overlap with an idle period of any of the FFPs of the second plurality of FFPs.

In particular embodiments, the uplink data is segmented into two or more segments and one segment of the two or more segments includes an indication that the wireless device will transmit the next segment of the two or more segments using wireless device initiated COT in a next FFP of the first plurality of FFPs.

In particular embodiments, the method further comprises receiving at the beginning of a COT an indication that a wireless device does not have uplink data to transmit.

In particular embodiments, the method further comprises signaling to another wireless device or network node whether the wireless device was successfully able to obtain a COT for wireless device initiated COT.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, in some embodiments the flexible COT behavior facilitates reliable and low latency transmissions.

BRIEF DESCRIPTION OF THE DRAWINGS

For a more complete understanding of the disclosed embodiments and their features and advantages, reference is now made to the following description, taken in conjunction with the accompanying drawings, in which:

FIG. 11 is flowchart illustrating an example method in a wireless device, according to certain embodiments;

FIG. 12 is flowchart illustrating an example method in a network node, according to certain embodiments;

DETAILED DESCRIPTION

As described above, certain challenges currently exist with channel occupancy time (COT)/fixed frame period (FFP) scheduling in unlicensed spectrum. Certain aspects of the present disclosure and their embodiments may provide solutions to these or other challenges.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Particular embodiments include FFP/COT scheduling with a plurality of behavior governed by COT initiation (e.g., gNB and/or UE), and operational mode (FBE, LBE).

In a first group of embodiments, for NR-U operation, a radio resource control (RRC) or downlink control information (DCI) based signaling is used to disable or enable UE-initiated COT behavior. This means if a UE transmission falls in the beginning of a COT, the user equipment (UE) can perform LBT and transmit its data or control signaling in the beginning of the COT if the UE-initiated COT feature is enabled. The enabling or disabling of UE-initiated COT feature can be done, e.g., according to any of the following.

For example, the signaling may be in a unicast, or multicast, or broadcast manner (e.g., group-common DCI may be used). The signaling may be on the basis of component carriers (CCs), e.g., UE-initiated COT feature is disabled on some CCs and enabled on some other CCs. The signaling may be on the basis of listen-before-talk (LBT) channels in which the sensing procedure is performed if the cell is divided into multiple LBT channels.

The UE-initiated COT transmission, e.g., can include any of the following. They may include uplink data transmission over physical uplink shared channel (PUSCH), uplink control information (UCI) over physical uplink control channel (PUCCH) or PUSCH, sounding reference signals (SRS), and/or any uplink transmission initiated by the UE (e.g., physical random access channel (PRACH)).

In some embodiments, the FFPs of the gNB and UE(s) are fully aligned (same duration, same boundary). An example is illustrated in FIG. 2.

Figure 1:
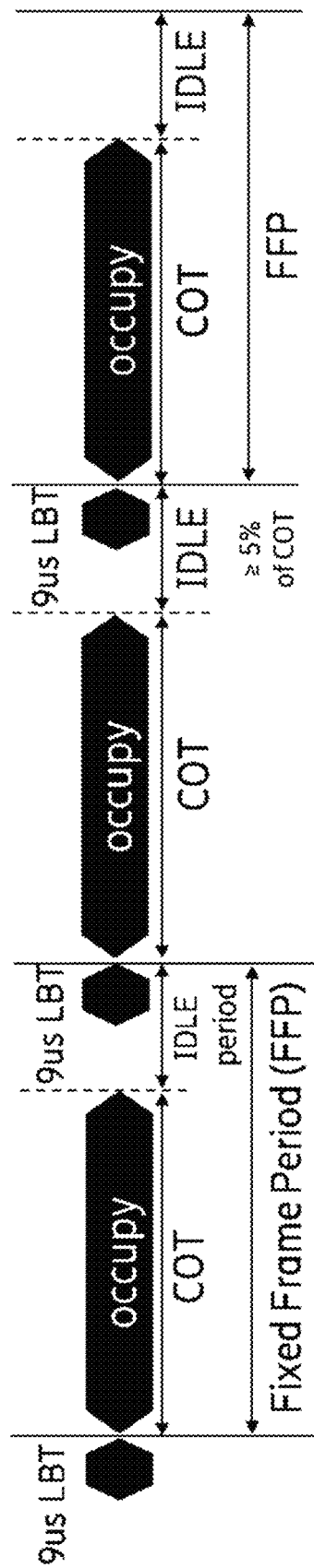
FIG. 1 is a timing diagram illustrating an example FBE procedure depicting Third Generation Partnership Project (3GPP) semi-static channel occupancy.
Figure 2:
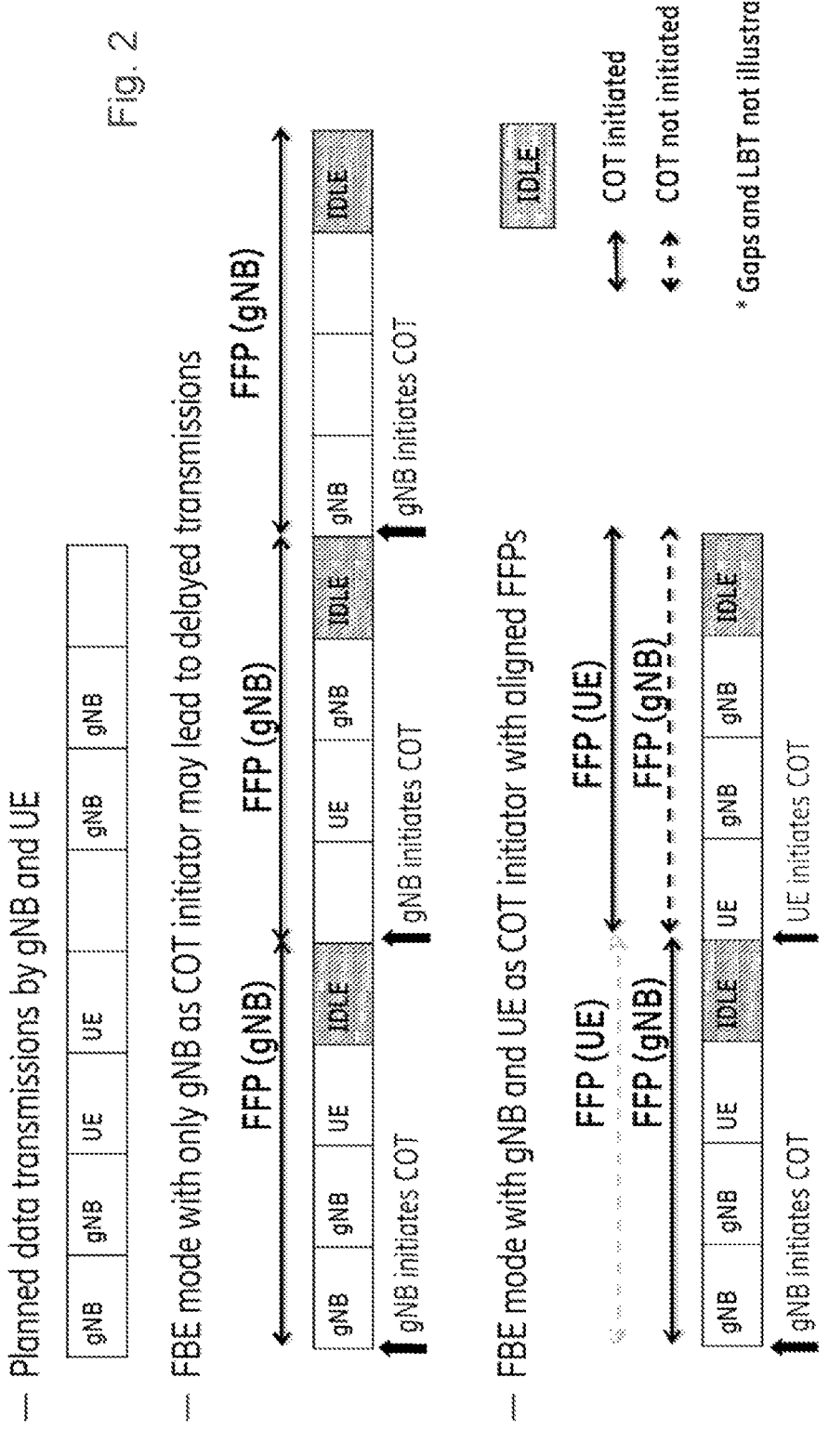
FIG. 2 is a timing diagram illustrating gNB-initiated and UE-initiated channel occupancy time (COT) transmission, according to a particular embodiment.

FIG. 2 is a timing diagram illustrating gNB-initiated and UE-initiated COT transmission, according to a particular embodiment. FIG. 2 illustrates the planned data transmissions by gNB and UE in the first row. For gNB-initiated COT (2nd row), the second part of the UE transmission is postponed to the next uplink transmission opportunity after gNB initiates the next COT. Also, because of the UE transmission delay, the second part of the gNB is postponed to the 3rd COT.

With UE initiated COT, the UE can transmit the second part of its transmission directly after the first FFP at the beginning of the next COT, so that all transmissions can be performed in that COT.

In some embodiments, the FFPs of the gNB and UE(s) are not aligned (different duration, different boundaries). An example is illustrated in FIG. 3.

Figure 3:
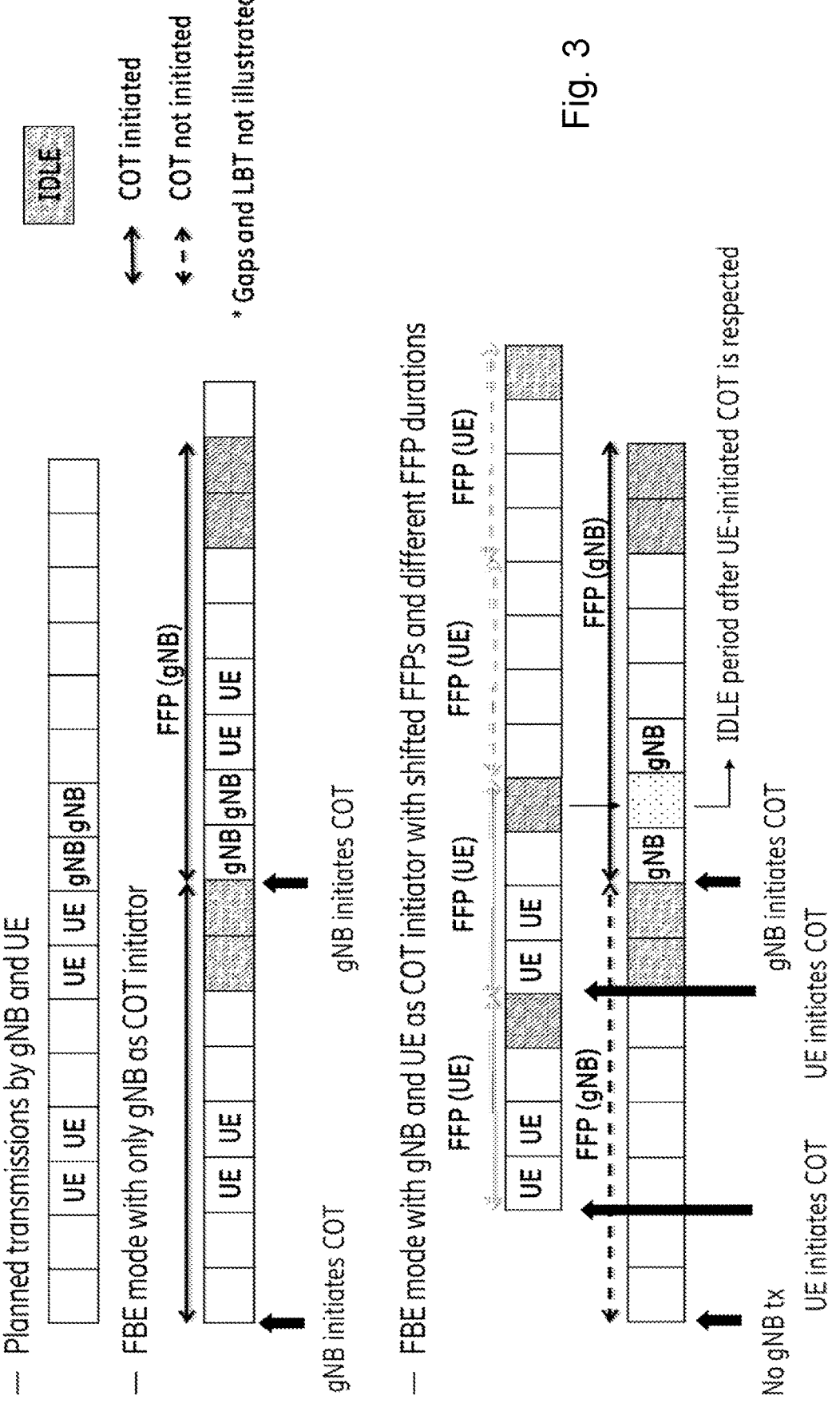
FIG. 3 is a timing diagram illustrating gNB-initiated and UE-initiated COT transmission where the FFPs are not aligned, according to a particular embodiment.

FIG. 3 is a timing diagram illustrating gNB-initiated and UE-initiated COT transmission where the FFPs are not aligned, according to a particular embodiment. FIG. 3 illustrates the planned data transmissions by gNB and UE in the first row. As shown in the second row, illustrating gNB initiated COT only, the second UE transmission burst intersects with the IDLE period of the gNB's FFP. Therefore, the UE has to wait until the next gNB initiated COT and its downlink transmissions before the UE can transmit its data, leading to some uplink transmission delay.

If the gNB does not have downlink data, the gNB may decide not to initiate its COT. For a UE that is allowed to initiate its own COT within the gNB's unused FFP, the UE can perform the second transmission burst even in the gNB's IDLE period, because the gNB did not use its FFP. The gNB can initiate a new COT. However, whenever the COTs overlap, the nodes need to respect the other node's IDLE period. As illustrated in FIG. 3, the gNB needs to cancel or postpone its transmission during the UE's IDLE period.

In a second group of embodiments, for NR-U operation with UE-initiated COT disabled in the gNB's FFP, if a PUSCH transmission (dynamic or CG based) occurs over the resource that spans over the FFP boundary, then the following embodiments handle segmentation of the repetition.

In some embodiments, the repetitions that overlap fully or partially with invalid resources are not transmitted. In this case, the resources that fall in the idle period plus an additional margin (X, where X>0 ms) are considered invalid. The UE may resume the transmission in the subsequent COT if it detects a downlink transmission that initiates that COT and has assigned resources (dynamically scheduled or configured). An example is illustrated in FIG. 4.

Figure 4:
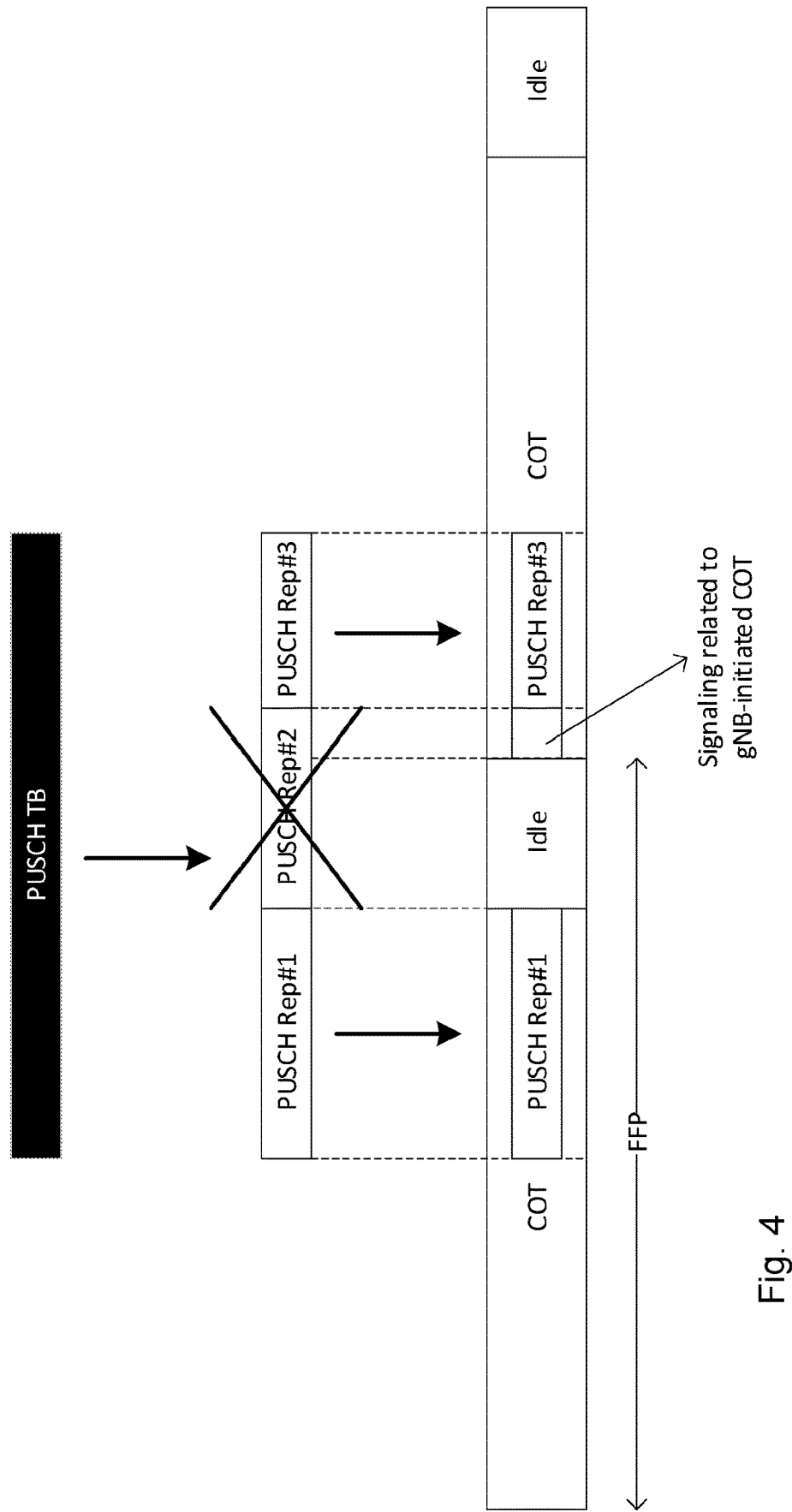
FIG. 4 is a timing diagram illustrating the segmented part of a transport block that occurs over the idle period and resources meant for gNB-initiation of the COT that is not transmitted, according to a particular embodiments.

FIG. 4 is a timing diagram illustrating the segmented part of a transport block that occurs over the idle period and resources meant for gNB-initiation of the COT that is not transmitted, according to a particular embodiments. As illustrated in FIG. 4, the transmission (PUSCH transport block) is segmented into three repetitions, Rep #1, Rep #2 and Rep #3. Rep #1 occurs over the COT of an FFP where the transmission of the non-segmented PUSCH transport block (TB) is supposed to begin. Rep #2 occurs over the Idle period plus the resource meant for gNB-COT initiation in the next FFP, and Rep #3 occurs in the COT of next FFP after gNB-initiation.

There are multiple options for UE transmission behavior when the transmission intersects with the FFP boundary. In some embodiments, only the intersecting repetition is not transmitted by the UE, i.e., Rep #1 and Rep #3 are transmitted but Rep #2 is not transmitted because it occurs over invalid symbols or resources.

In some embodiments, the complete PUSCH TB is not transmitted (i.e., Rep #1, Rep #2 and Rep #3 are not transmitted).

In some embodiments, only repetitions that can be transmitted in the current COT are transmitted, while all other repetitions that would occur within or after invalid symbols/resources and/or in the subsequent FFP are not transmitted, i.e., Rep #1 is transmitted, while Rep #2 and Rep #3 are not transmitted.

In a third group of embodiments, for NR-U operation with UE-initiated COT enabled in the FFP, if a PUSCH transmission (dynamic or CG based) occurs over the resource that spans over the FFP boundary, then the following embodiments handle the segmentation of the repetition. The repetitions that overlap fully or partially with invalid resources are not transmitted. In this case, the resources that fall in the idle period are considered invalid. The UE may resume the transmission in the subsequent COT if it is assigned resources (dynamically scheduled or configured) and able to successfully initiate a UE COT at the beginning of the FFP. An example is illustrated in FIG. 5.

Figure 5:
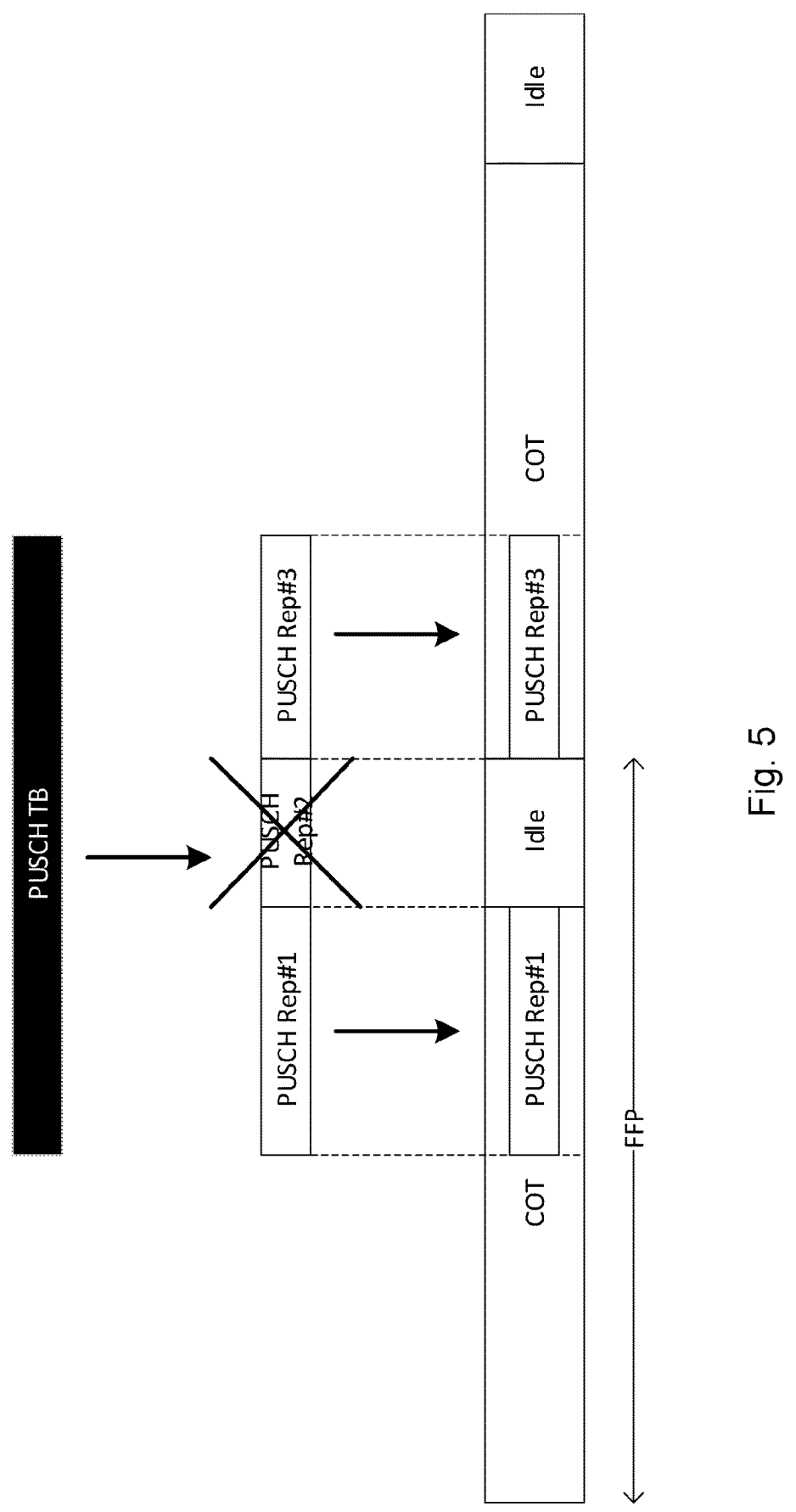
FIG. 5 is a timing diagram illustrating a segmented part of the repetition over the idle period that is not transmitted, according to a particular embodiment.

FIG. 5 is a timing diagram illustrating a segmented part of the repetition over the idle period that is not transmitted, according to a particular embodiment. As illustrated in FIG. 5, the transmission of the PUSCH TB is segmented into three repetitions Rep #1, Rep #2 and Rep #3. Rep #1 occurs over the COT of an FFP where the non-segmented PUSCH TB is supposed to begin. Rep #2 occurs over the Idle period, and Rep #3 occurs in the COT of the next FFP where the transmission of Rep #3 acts as an indication of UE initiating the COT. Rep #1 and Rep #3 are transmitted but Rep #2 is not transmitted because it occurs over invalid symbols or resource.

In some embodiments, the indication of UE-initiated COT with Rep #3 can be indicated in Rep #2.

Figure 6:
FIG. 6 is a timing diagram illustrating a segmented part of the repetition that is overlapping with the invalid symbols is transmitted after invalid resource, according to a particular embodiment.

In a fourth group of embodiments, unlike in FIGS. 4 and 5, the Rep #2 is transmitted after invalid symbols/resource, as illustrated in FIG. 6.

FIG. 6 is a timing diagram illustrating a segmented part of the repetition that is overlapping with the invalid symbols is transmitted after invalid resource, according to a particular embodiment. The invalid symbols may indicate Idle period, or Idle period plus downlink resource (e.g., meant for gNB-initiated signaling).

In a fifth group of embodiments, any of the second, third, and fourth groups of embodiments may further comprise segmenting the repetition around the slot-boundary when the slot-boundary occurs in the COT/FFP.

In a sixth group of embodiments, if a UE is scheduled with transmission in the beginning of an FFP and the UE does not have data to transmit, then the UE can inform or signal gNB about "no data" transmission. This signaling (in the form of UCI/sequence over PUCCH or PUSCH) serves purpose of grabbing the COT and also enables the gNB to act fast because there will be no data transmission from the UE and the gNB needs to transmit or allocate resource to other UEs, in case the gNB intends to keep the COT (especially if interferers are operating in the same spectrum in the vicinity).

In a seventh group of embodiments, if a UE configured with normal/larger PUSCH (can belong to dynamic or CG allocation), then additional smaller PUSCH or PUCCH can be configured which begins at the same time as normal PUSCH.

The purpose of the smaller PUSCH or PUCCH is if there is no data to transmit in normal PUSCH, then the UE can transmit specific data sequence or UCI in smaller PUSCH or UCI in PUCCH. The transmission of the data sequence or UCI is useful when the gNB does not initiate the COT and waits for UE initiating the COT. With this, gNB is able to conserve the resources in normal PUSCH in case there is no data to transmit and at the same time allows the UE to grab the COT by transmitting in a smaller PUSCH/PUCCH so that the gNB may continue transmissions in the same COT.

In an eighth group of embodiments, for some carriers or channels, the UE-initiated COT behavior can be enabled and for some carriers, the behavior can be disabled.

In a ninth group of embodiments, the gNB can do dynamic or CG based allocation with cross-FFP scheduling (e.g., see FIG. 6) where one repetition is allocated in one FFP and another in the next FFP. If a repetition falls in the beginning of the COT, then the following options can occur. Some of the options are described with respect to FIG. 7.

Figure 7:
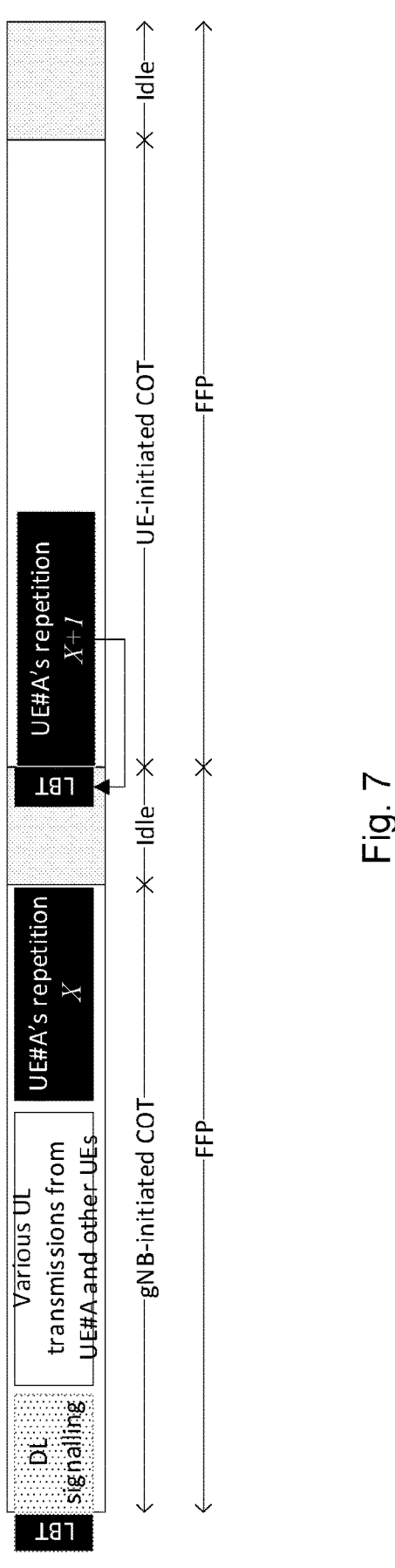
FIG. 7 is a timing diagram illustrating an example where a UE transmits its repetition X in gNB-initiated COT, and in the next COT the UE initiates the transmission by transmitting next Rep #X+1.

FIG. 7 is a timing diagram illustrating an example where a UE transmits its repetition X in gNB-initiated COT (as gNB transmits some DL signaling in the beginning of the COT) and in the next COT, the UE initiates the transmission by transmitting next Rep #X+1.

If UE-initiated COT is not allowed, then the UE does not transmit that repetition (i.e., Rep #X+1 in FIG. 7). The UE waits for gNB-COT initiation signaling and if it receives or decodes the signaling, then the UE transmits its Rep #X+1. The gNB-COT initiation signaling happens over the initial part of the repetition resource meant for Rep #X+1, therefore following options can occur.

In one option, Rep #X+1 occurs over the remaining resource (originally meant for Rep #X+1 before gNB COT initiation signaling) if repetition X+1 still can be accommodated, or the segment of Rep #X+1 occurs over remaining resource and Rep #X+1 is divided in two segments, one segment overlaps with gNB COT initiation signaling, and thus, this segment is not transmitted; other segment occurs over the remaining resource.

If UE-initiated COT is allowed, then in such scenarios, the UE can transmit right away from the beginning of a COT if the LBT at the end of idle period is successful (gNB can assume this repetition transmission as an implicit indication for COT initiation). The UE may indicate during its uplink transmissions in the gNB initiated COT that it will initiate the next COT.

In a tenth group of embodiments, if a UE is scheduled or performs transmission at the end of a COT and if it is also granted transmission in the beginning of the next FFP while the UE does not have more data to transmit, then the UE can inform or signal the gNB about "no data" transmission in the UCI and thus allow gNB to initiate the next COT.

An eleventh group of embodiments includes UE initiated COT in FBE scenario. If the UE transmissions for the UE are scheduled (i.e., not pre-configured), the gNB can derive the remaining COT duration that can be used by the gNB without an explicit indication from the UE.

If the UE performs the transmissions based on preconfigured resources, even though the start of the UE's COT is known to the gNB, the duration of the uplink transmission is up to the UE (depends on the UE's buffer, and the available resources). The UE could either indicate the start time for the gNB, or its own transmission duration (gNB start time=UE start time plus transmission duration), or the remaining COT (gNB start time=end of COT minus remaining COT). The UE may indicate to the gNB one of the parameters through a UCI (over PUSCH or PUCCH on preconfigured uplink resources).

In a twelfth group of embodiments, the repetitions (or multi-segment transmissions) are allocated based on which node initiates the COT. For example, all repetitions may be on gNB-initiated COT(s) or all repetitions may be on UE-initiated COT(s). Some repetitions can be allocated on gNB-initiated COT(s) and some on UE-initiated COT(s) (e.g., see FIG. 4).

In some embodiments, a repetition transmission may fall in the beginning of a COT, and if the UE is not allowed to initiate the COT by default, then following solutions can be considered. IN some embodiments, the UE skips the transmission in the beginning of the COT. In some embodiments gNB sends downlink signaling, e.g., a DCI in the beginning of COT, and then UE can transmit in the remaining resource, and the UE can include UCI (in the PUSCH transmission)

indicating updated information to decode the transmission. In some embodiments, the gNB can inform the UE beforehand and give permission to initiate in such COTs where the UE's transmission falls in the beginning of the COT, and for this, an appropriate downlink signaling (DCI/reference signaling) may be used.

If the UE cannot grab the channel, the following solutions can be considered on how the gNB finds out about the loss of COT initiation by the UE. In some embodiments, ff the UE is allowed to transmit a TB in the beginning of the COT, and if the gNB does not detect the TB (i.e., DMRS of the TB), then the gNB concludes that the UE did not grab the COT. In some embodiments, if the UE is allowed to transmit UCI in the beginning of the COT, and if the gNB does not detect the UCI, then the gNB concludes that the UE did not grab the COT. In some embodiments, if the UE has UCI resource allocated later in the same FFP, i.e., FFP #A (and in another FFP, i.e. FFP #B) and may transmit negative feedback in the UCI about COT initiation (LBT failure indication) (e.g., see FIG. 8). Additionally, the UE may indicate its buffer status so that the gNB may provide the UE with an uplink grant in the COT of FFP #B. In other words, this UCI can act as a scheduling request (SR).

Figure 8:
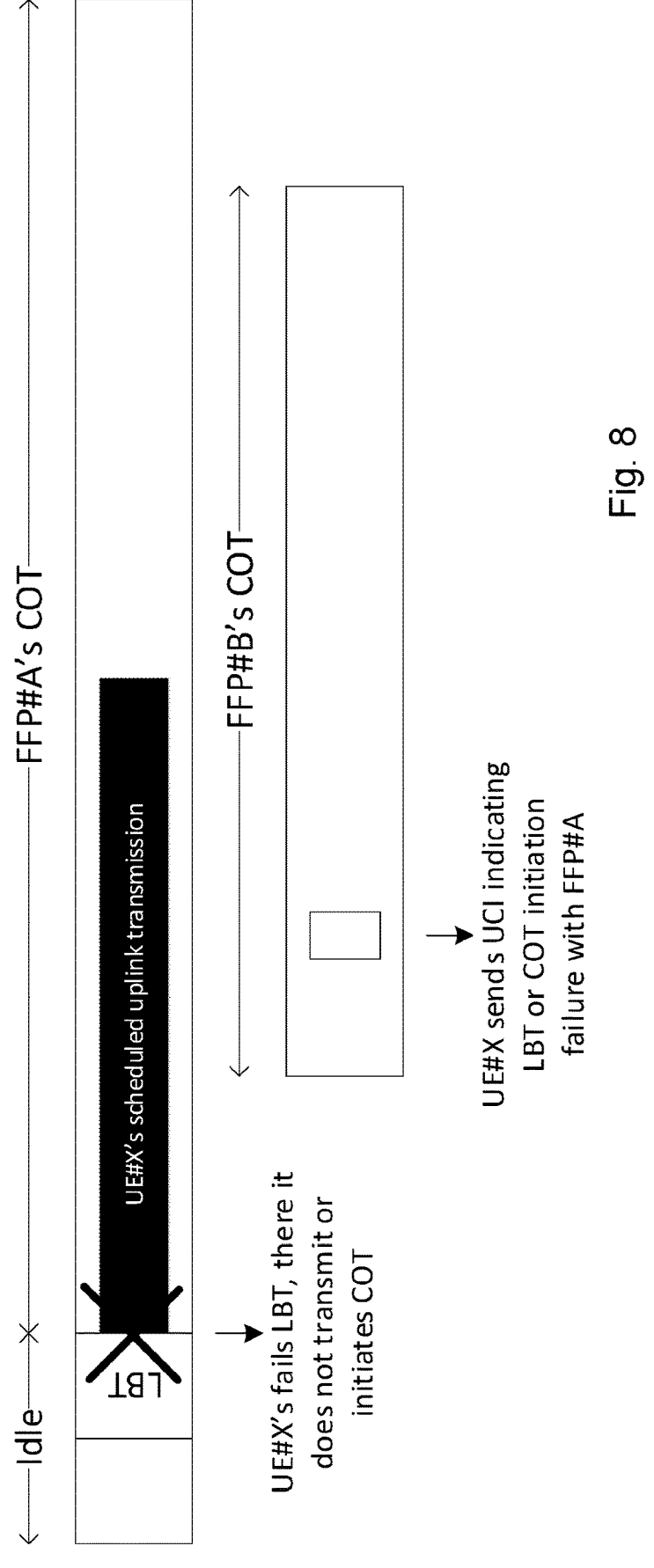
FIG. 8 is a timing diagram illustrating UCI indicating COT-initiation failure for another FFP, according to a particular embodiment.

FIG. 8 is a timing diagram illustrating UCI indicating COT-initiation failure for another FFP, according to a particular embodiment.

In some embodiments, a transmission may fall over the idle period of FFP, then following solutions can be considered. In some embodiments, the UE skips the transmission if a part of the transmission intersects the idle period. In some embodiments, the UE can transmit the transmission in the resource only that is not part of an idle period in an FFP (i.e., on COT only), and for this the UE may include UCI in the PUSCH transmission (to indicate the updated control information as the transmission is squeezed to fewer resource dynamically). Further options can be considered as well.

In some embodiments, if the resource is in the beginning of the COT, either gNB or UE-initiated COT can be employed. If, e.g., a transmission falls over the end of a COT, idle period and beginning of COT in the next FFP, then transmission can be divided into two or more segments where these segments are only transmitted in the COTs, i.e., one or more segments in the COT prior to the idle period and one or more segments in the COT later to the idle period.

Each segmented transmission may be equipped with UCI to indicate the decoding information, the segment identity, etc.

A thirteenth group of embodiments includes a single UE configured with both modes-LBE and FBE which can happen with resource allocation for the same HARQ process, e.g., (a) with different component carriers (CCs), (b) with different repetitions, (c) with transmission modes-initial transmissions, retransmissions and reattempt. In some embodiments, in a cell, some UEs can be configured with just FBE mode and some UEs with just LBE mode.

In a fourteenth group of embodiments, the UE is configured with both LBE and FBE mode and the UE can dynamically change between FBE and LBE mode where LBE mode operates as a fallback LBT mode.

In FBE mode, when UE or gNB determines COT is not initiated, the UE/gNB can attempt to access the channel performing LBE based channel access procedures. In this case, for initial transmission, the UE/gNB has to perform an LBT procedures based on LBE corresponding to the intended transmission properties, using LBE channel access rules.

The UE can include the type of LBT or mode of LBT in its uplink UCI. The gNB upon detection of the UCI and determining that the UE has performed Cat 4 LBT, may switch to channel access operation based on LBE in the current FFP or the next one or some other FFPs.

The gNB can include LBE channel access commands for uplink transmissions in the downlink control information to a UE or a group of UEs that are used for scheduling or other purposes, such as group common control signaling.

In another example, the gNB can indicate by using a flag in DCI to the UE or a group of UEs to switch to LBE mode and maintain LBE mode until indicated otherwise. The gNB can switch back to the FBE mode of operation starting for example from an FFP and indicate to the UEs using a flag in the DCI to the UE or a group of UEs to switch to FBE mode.

The FFPs that channel access modes can be changed within can follow a pattern provided by configuration, or dynamically signaled.

In a fifteenth group of embodiments, in a UE-initiated COT, the gNB signals other UEs sharing the COT regarding COT success (i.e., others UEs sharing the COT can transmit as per regulation for unlicensed operation). The signaling can be based on DCI transmitted over PDCCH or PDSCH, or in the form of transmission of reference or synchronization signals broadcasted/multicasted/unicasted to indicate the COT success.

In some embodiments, in a UE-initiated COT, the UE that initiated the COT signals other UEs for the COT success over side-link channels. The signaling can be transmitted over sidelink control channel (SLCCH) or sidelink shared channel (SLSCH) or a reference signal to indicate the COT success.

In some embodiments, in a UE-initiated COT, the gNB signals only other UEs sharing the COT if there is COT grabbing failure (i.e., COT is busy or occupied, and could not be up for grabbing). This is beneficial in controlled environment scenarios, for example, where COT success is highly probable and the gNB transmits signaling/indication only in case COT success failure because this incurs less signaling transmission overhead. The signaling may be based on DCI over PDCCH or PDSCH, or in the form of transmission of a reference or synchronization signal broadcasted/multicasted/unicasted to indicate the COT success failure.

In a sixteenth group of embodiments, the gNB a-priory selects which type of signaling information to be used to indicate COT success or not. For example, in an uncontrolled environment, the gNB may prefer to send signaling related to positive COT success (i.e., LBT before the COT is successful and the COT is up for grabbing) because the success probability may be low and therefore may have low signaling overhead. In a controlled environment, the gNB may prefer to deliver signaling indicating negative COT success (i.e., COT is busy or occupied, and could not be up for grabbing).

In the above embodiments, the transmissions can be in uplink or downlink. For example, if a transmission is in uplink, then data transmission can occur over PUSCH. Further, the PUSCH may be equipped with UCI (included in PUSCH) to update its decoding information. Similarly, in downlink, the data transmission may happen over PDSCH. Further, the PUSCH may be equipped with DCI (included in PDSCH) to update its decoding information.

In the above embodiments, the transmissions may be a part of SPS/CG or dynamic-based allocations wherever possible. The above embodiments may be used in separation or combinations.

Although particular embodiments and examples are described with respect to NR-U, the embodiments and examples are applicable generally to any shared spectrum channel access operation (e.g., not limited to unlicensed operation, but also applies to shared spectrum operation generally).

Figure 9:
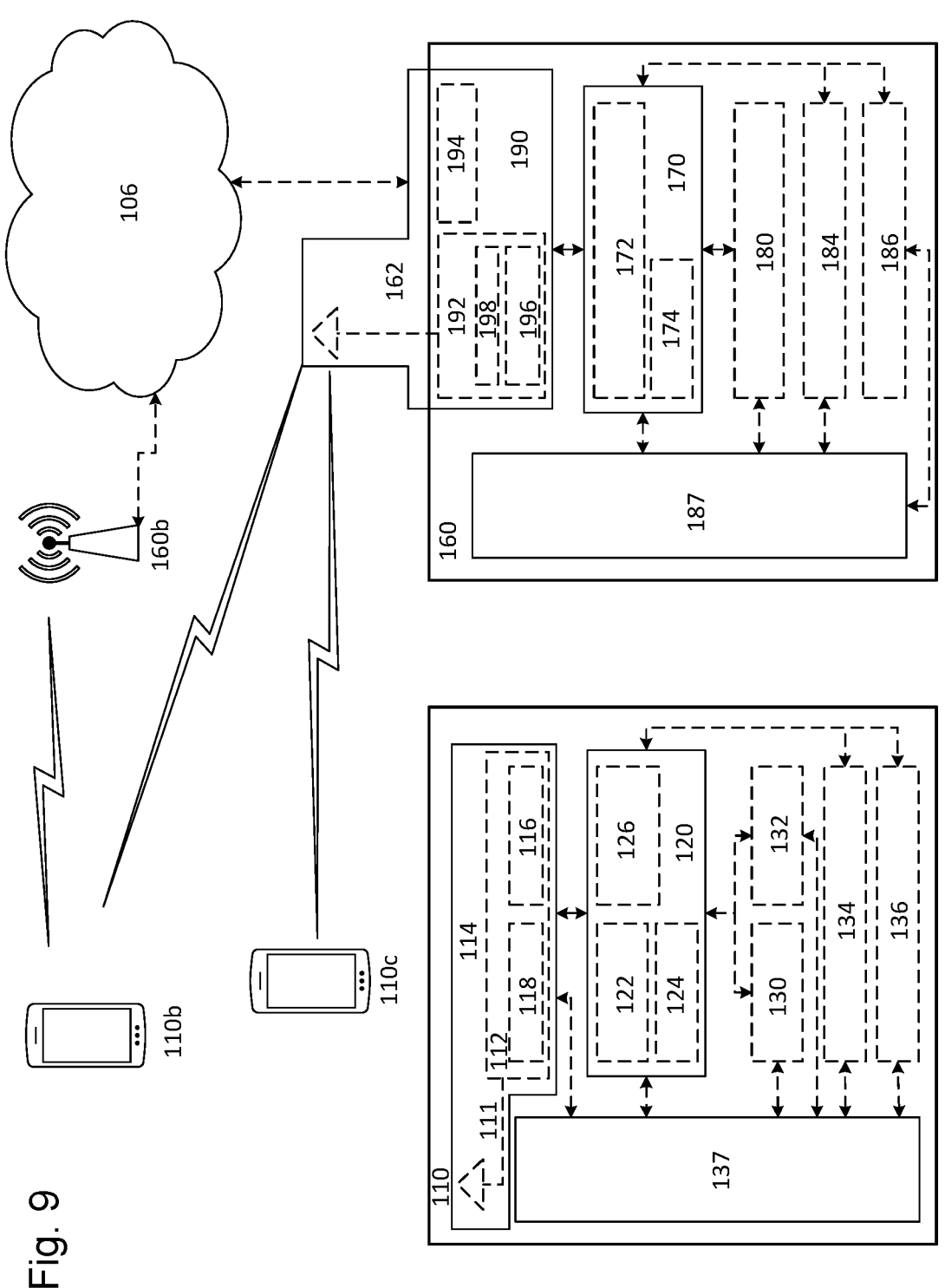
FIG. 9 is a block diagram illustrating an example wireless network.

FIG. 9 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicleto-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 10:
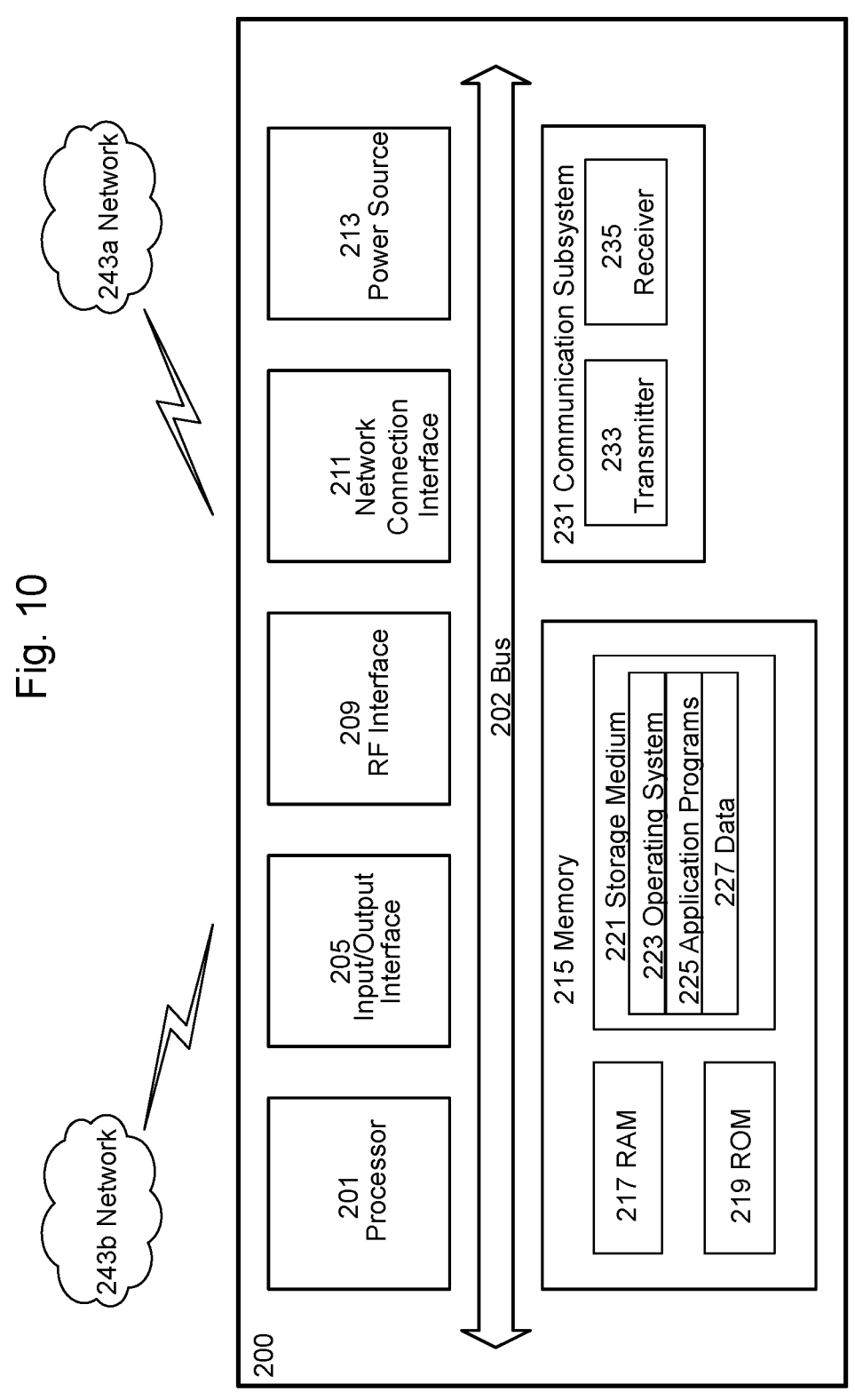
FIG. 10 illustrates an example user equipment, according to certain embodiments.

FIG. 10 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 10, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

FIG. 11 is a flowchart illustrating an example method in wireless device, according to certain embodiments. In particular embodiments, one or more steps of FIG. 11 may be performed by wireless device 110 described with respect to FIG. 9. The wireless device is operable to operate in shared spectrum channel access. A first plurality of FFPs are associated with the wireless device and a second plurality of FFPs are associated with a network node (e.g., network node 160). Each FFP comprises an idle period with no transmission and a COT for potential transmission.

The method may begin at step 1112, where the wireless device (e.g., wireless device 110) receives an indication that the wireless device may initiate a COT in one of the FFPs of the first plurality of FFPs. For example, wireless device 110 may receive the indication from network node 160 (e.g., via RRC, DCI, etc.). The indication may be unicast, multicast or broadcast. The indication may be per component carrier or per LBT channel. The indication may comprise any of the indications described with respect to the first group of embodiments above.

At step 1114, the wireless device initiates a COT in one of the FFPs of the first plurality of FFPs and at step 1116 transmits uplink data from the beginning of the COT. For example, wireless device 110 may transmit uplink data over PUSCH, UCI over PUSCH or PUCCH, PRACH, reference signals, or any other transmission initiated by a wireless device. Examples are illustrated in FIGS. 2-8.

In particular embodiments, the first plurality of FFPs and the second plurality of FFPs are not aligned in the time domain and transmitting uplink data comprises refraining from transmitting uplink data in an idle period of any of the FFPs of the second plurality of FFPs. For example, the wireless device does not transmit uplink in its own idle periods and the wireless device also refrains from transmitting in the idle period of the network node. An example is illustrated in FIG. 3.

In particular embodiments, the first plurality of FFPs and the second plurality of FFPs are not aligned in the time domain and transmitting uplink data comprises segmenting the uplink data into two or more segments and refraining from transmitting any of the two or more segments that overlap with an idle period of any of the FFPs of the second plurality of FFPs. An example is illustrated in FIG. 4.

In particular embodiments, the first plurality of FFPs and the second plurality of FFPs are not aligned in the time domain and transmitting uplink data comprises segmenting the uplink data into two or more segments and refraining from transmitting all of the two or more segments if any of the two or more segments overlap with an idle period of any of the FFPs of the second plurality of FFPs. That is, if any of the segments overlap with an idle period of the network node, the wireless device does not transmit any of the segments.

In particular embodiments, the first plurality of FFPs and the second plurality of FFPs are not aligned in the time domain and transmitting uplink data comprises segmenting the uplink data into two or more segments and refraining from transmitting any of the two or more segments after one of the two or more segments overlap with an idle period of any of the FFPs of the second plurality of FFPs. That is, the wireless device transmits segments until one segment overlaps with an idle period of the network node and then the wireless device refrains from transmitting any more subsequent segments.

In particular embodiments, transmitting uplink data comprises segmenting the uplink data into two or more segments and one segment of the two or more segments includes an indication that the wireless device will transmit the next segment of the two or more segments using wireless device initiated COT in a next FFP of the first plurality of FFPs.

In some embodiments, the wireless device may initiate a COT, but the wireless device may not have data to send, so the wireless device may inform the network node so that the network node may begin using the COT. In this case the method continues to step 1118 where the wireless device determines the wireless device does not have uplink data to transmit at the beginning of a COT and step 1120 where the wireless device transmits at the beginning of the COT an indication to a base station that the wireless device does not have uplink data to transmit.

In some embodiments, the wireless device may attempt to initiate a COT, but fails to successfully initiate the COT (e.g., collision occurred). In this case the method continues to step 1122 where the network node signals to another wireless device or network node whether the wireless device was successfully able to obtain a COT for wireless device initiated COT. Examples are described with respect to the fifteenth, sixteenth, an seventeenth group of embodiments.

Modifications, additions, or omissions may be made to method 1100 of FIG. 11. Additionally, one or more steps in the method of FIG. 11 may be performed in parallel or in any suitable order.

FIG. 12 is a flowchart illustrating an example method in a network node, according to certain embodiments. In particular embodiments, one or more steps of FIG. 12 may be performed by network node 160 described with respect to FIG. 9. The network node is operable to operate in shared spectrum channel access. A first plurality of FFPs are associated with a wireless device (e.g., wireless device 110)

and a second plurality of FFPs are associated with the network node. Each FFP comprises an idle period with no transmission and a COT for potential transmission.

The method may begin at step 1212, where the network node (e.g., network node 160) transmits an indication that the wireless device may initiate COT in one of the FFPs of the first plurality of FFPs. The indication may be the indication described with respect to step 1112 of FIG. 11.

At step 1214 the network node determines a wireless device initiated a COT in one of the FFPs of the second plurality of FFPs and at step 1216 the network node receives uplink data from the beginning of the COT. Examples are described with respect to FIGS. 2-9.

In particular embodiments, the first plurality of FFPs and the second plurality of FFPs are not aligned in the time domain and uplink data is not received in an idle period of any of the FFPs of the second plurality of FFPs. An example is illustrated in FIG. 3.

In particular embodiments, the first plurality of FFPs and the second plurality of FFPs are not aligned in the time domain and the uplink data is segmented into two or more segments and segments that overlap with an idle period of any of the FFPs of the second plurality of FFPs are not received.

In particular embodiments, the first plurality of FFPs and the second plurality of FFPs are not aligned in the time domain and the uplink data is segmented into two or more segments and none of the two or more segments are received if any of the two or more segments overlap with an idle period of any of the FFPs of the second plurality of FFPs.

In particular embodiments, the first plurality of FFPs and the second plurality of FFPs are not aligned in the time domain and the uplink data is segmented into two or more segments and the segments are not received after one of the two or more segments overlap with an idle period of any of the FFPs of the second plurality of FFPs.

In particular embodiments, the uplink data is segmented into two or more segments and one segment of the two or more segments includes an indication that the wireless device will transmit the next segment of the two or more segments using wireless device initiated COT in a next FFP of the first plurality of FFPs.

At step 1218, the network node may receive at the beginning of a COT an indication that a wireless device does not have uplink data to transmit. The network node may then use the COT for its own purposes.

At step 1220, the wireless device may signal to another wireless device or network node whether the wireless device was successfully able to obtain a COT for wireless device initiated COT. Examples are described above with respect to the fifteenth group of embodiments.

Modifications, additions, or omissions may be made to method 1200 of FIG. 12. Additionally, one or more steps in the method of FIG. 12 may be performed in parallel or in any suitable order.

Figure 13:
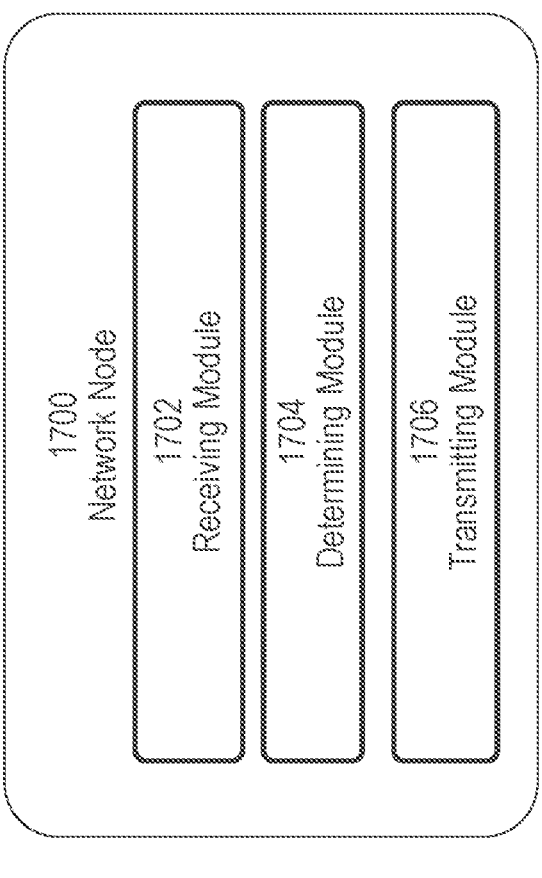
FIG. 13 illustrates a schematic block diagram of a network node and a wireless device in a wireless network, according to certain embodiments.

FIG. 13 illustrates a schematic block diagram of two apparatuses in a wireless network (for example, the wireless network illustrated in FIG. 9). The apparatuses may comprise a network node and a wireless device (e.g., wireless device 110 and network node 160 in FIG. 9). Apparatuses 1600 and 1700 are operable to carry out the example methods described with reference to FIGS. 11 and 12, respectively. Apparatuses 1600 and 1700 may be operable to carry out other processes or methods disclosed herein. It is also to be understood that the methods of FIGS. 11 and 12 are not necessarily carried out solely by apparatuses 1600 and 1700. At least some operations of the method can be performed by one or more other entities.

Virtual apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure.

As illustrated in FIG. 13, apparatus 1600 includes receiving module 1602 configured to receive an indication of whether the apparatus may initiate a COT, according to any of the embodiments and examples described herein. Determining module 1604 is configured to determine uplink data is available, whether a transmission will overlap with an idle period, and how to segment a transmission if needed, according to any of the embodiments and examples described herein. Transmitting module 1606 transmits uplink data according to any of the embodiments and examples described herein.

In some implementations, the processing circuitry may be used to cause receiving module 1702, determining module 1704, transmitting module 1706, and any other suitable units of apparatus 1700 to perform corresponding functions according one or more embodiments of the present disclosure.

As illustrated in FIG. 13, apparatus 1700 includes receiving module 1702 configured to receive uplink data from a wireless device, according to any of the embodiments and examples described herein. Determining module 1704 is configured to determine whether a wireless device initiated a COT, according to any of the embodiments and examples described herein. Transmitting module 1706 is configured to transmit an indication to a wireless device about whether the wireless device may initiate a COT, according to any of the embodiments and examples described herein.

Figure 14:
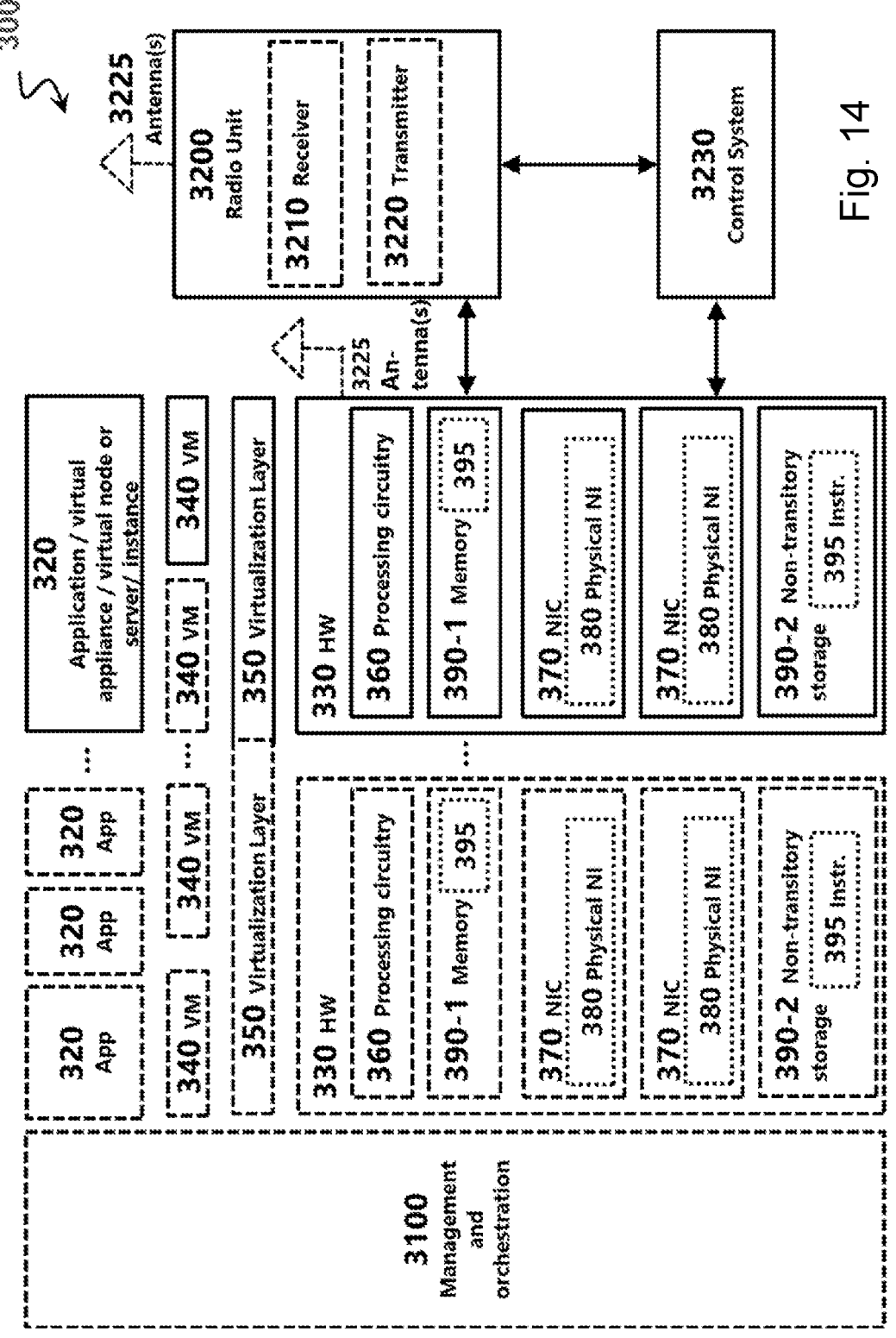
FIG. 14 illustrates an example virtualization environment, according to certain embodiments.

FIG. 14 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 14, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 14.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 15:
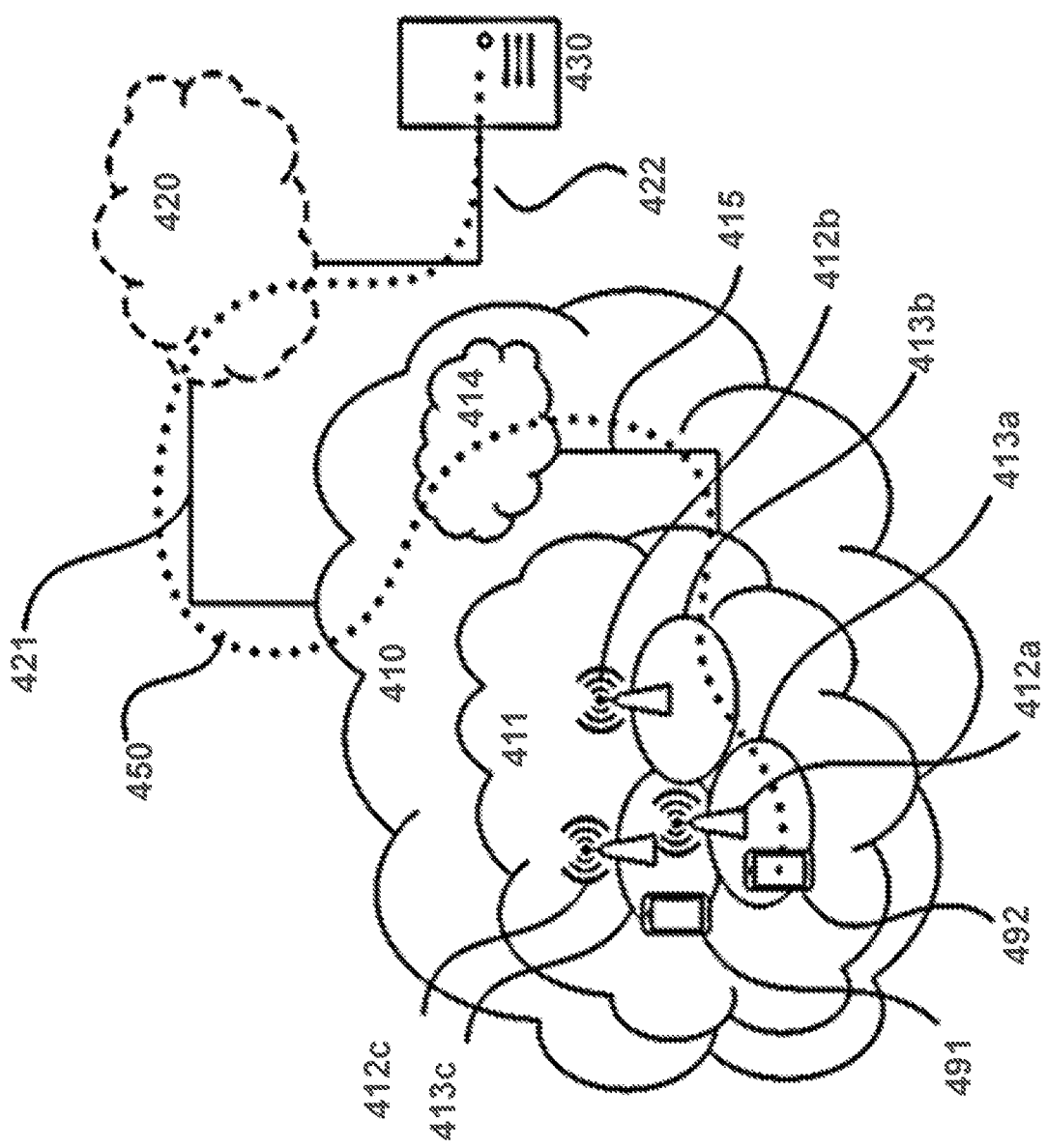
FIG. 15 illustrates an example telecommunication network connected via an intermediate network to a host computer, according to certain embodiments.

With reference to FIG. 15, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 15 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 16:
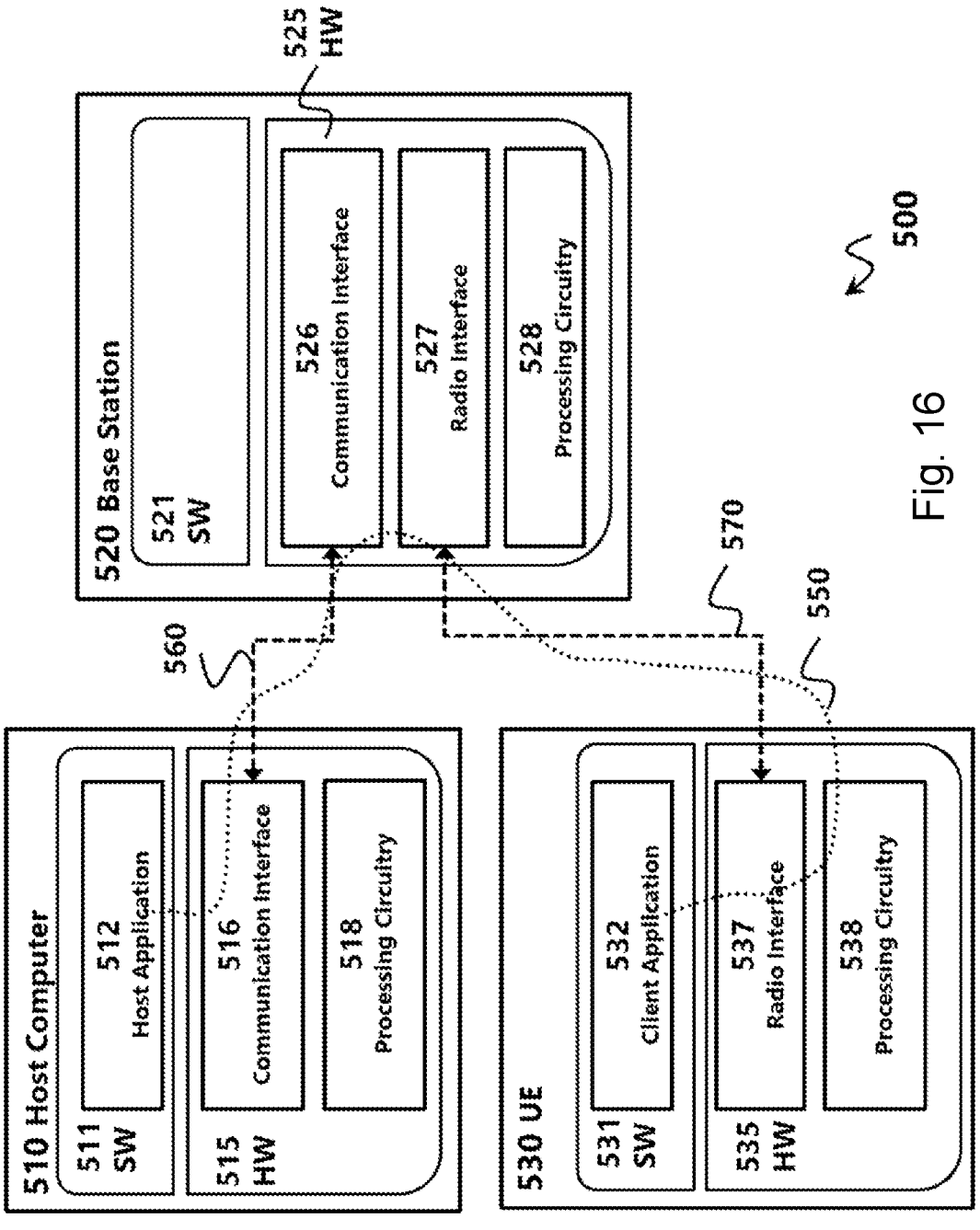
FIG. 16 illustrates an example host computer communicating via a base station with a user equipment over a partially wireless connection, according to certain embodiments.

FIG. 16 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 16. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 16) served by base station 520. Communication interface 526 may be configured to facilitate connection 560 to host computer 510. Connection 560 may be direct, or it may pass through a core network (not shown in FIG. 16) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 16 may be similar or identical to host computer 430, one of base stations 412*a*, 412*b*, 412*c* and one of UEs 491, 492 of FIG. 15, respectively. This is to say, the inner workings of these entities may be as shown in FIG. 16 and independently, the surrounding network topology may be that of FIG. 15.

In FIG. 16, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 17:
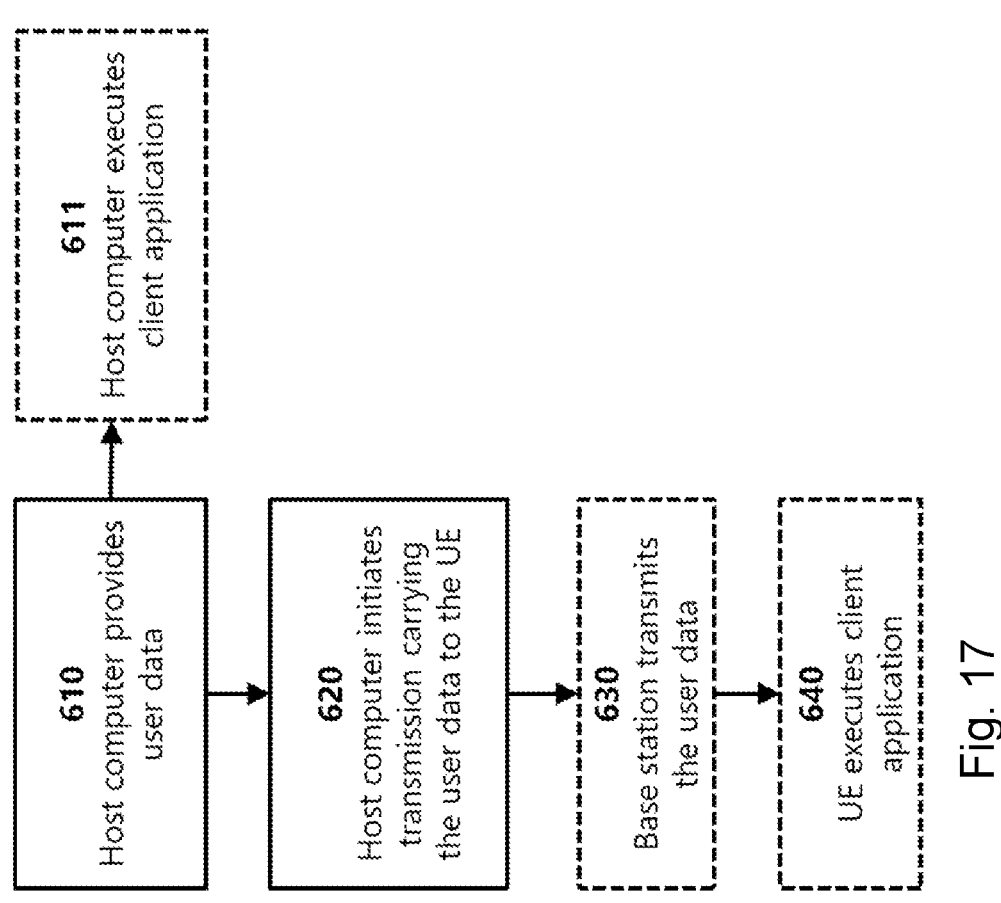
FIG. 17 is a flowchart illustrating a method implemented, according to certain embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 18:
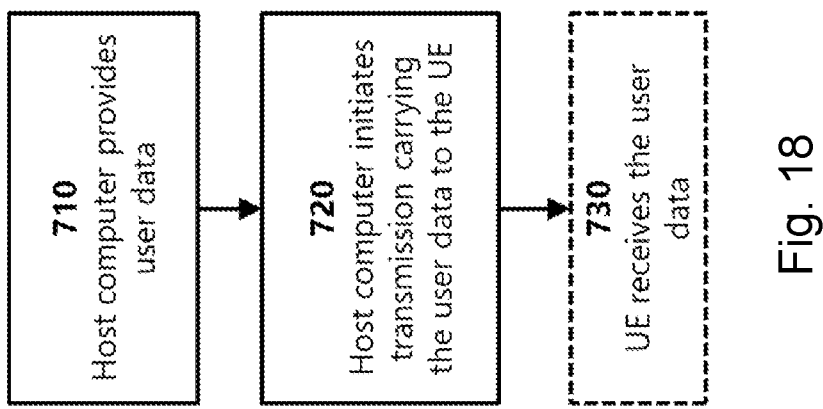
FIG. 18 is a flowchart illustrating a method implemented in a communication system, according to certain embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 19:
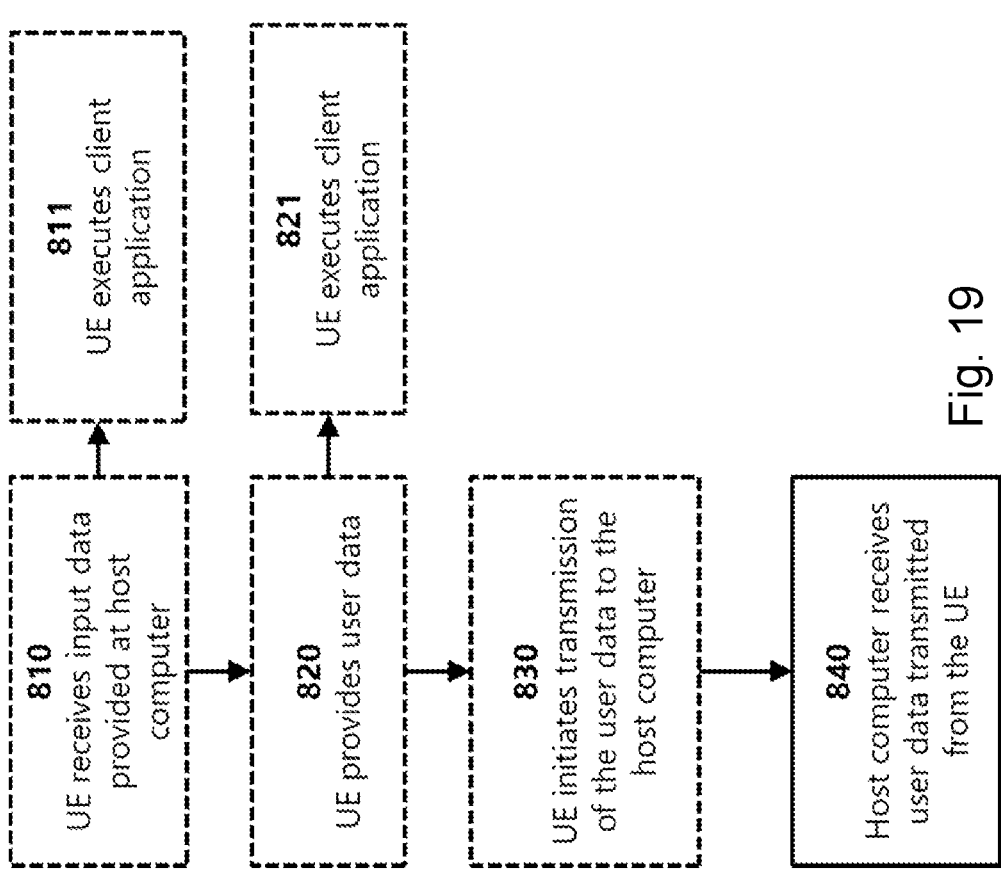
FIG. 19 is a flowchart illustrating a method implemented in a communication system, according to certain embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 20:
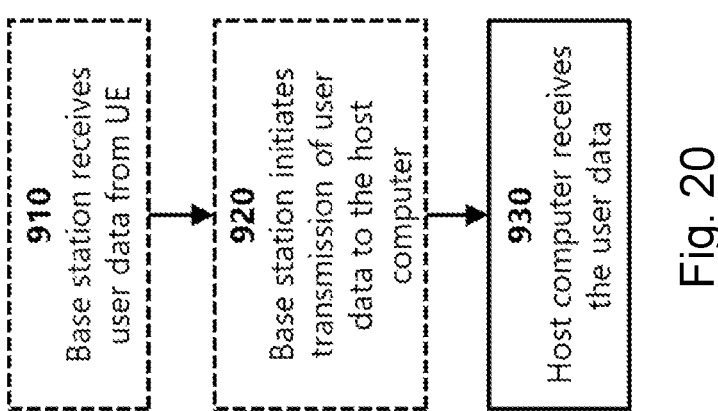
FIG. 20 is a flowchart illustrating a method implemented in a communication system, according to certain embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GS 5G System
ABS Almost Blank Subframe
ARQ Automatic Repeat Request
AWGN Additive White Gaussian Noise
BCCH Broadcast Control Channel
BCH Broadcast Channel
BW Bandwidth
CA Carrier Aggregation
CC Carrier Component
CCA Clear Channel Access
CCCH SDU Common Control Channel SDU
CDMA Code Division Multiplexing Access
CE Control Element
CGI Cell Global Identifier
CIR Channel Impulse Response
CNC Central Network Controller (for TSN)
COT Channel Occupancy Time
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
D2D Device-To-Device
DCCH Dedicated Control Channel
DL Downlink
DM Demodulation
DMRS Demodulation Reference Signal
DRX Discontinuous Reception
DS-TT Device Side TSN Translator
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FBE Frame Based Equipment
FDD Frequency Division Duplex
FFP Fixed Frame Period
GERAN GSM EDGE Radio Access Network
GM Grand Master
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IIOT Industrial Internet-of-Things
LBE Load Based Equipment LBT Listen-Before-Talk
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
NW-TT Network-side TSN Translator
OCNG OFDMA Channel Noise Generator
OFDM Orthogonal Frequency Division Multiplexing
OFDMA Orthogonal Frequency Division Multiple Access
OSS Operations Support System
OTA Over the Air
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PD Propagation Delay
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
ppb parts per billion
PRACH Physical Random Access Channel
PRS Positioning Reference Signal
PSS Primary Synchronization Signal
PTP Precision Time Protocol
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RAR Random Access Response
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RTT Round Trip Time
SCH Synchronization Channel
SCell Secondary Cell
SCS Subcarrier Spacing
SDU Service Data Unit
SFN System Frame Number SGW Serving Gateway
SI System Information
SIB System Information Block
SNR Signal to Noise Ratio
SON Self Optimized Network
SS Synchronization Signal
SSS Secondary Synchronization Signal
TA Timing Advance
TDD Time Division Duplex
TDOA Time Difference of Arrival
TOA Time of Arrival
TS Time Synchronization
TSN Time Sensitive Networking
TSS Tertiary Synchronization Signal
TTI Transmission Time Interval
UE User Equipment
UL Uplink
UMTS Universal Mobile Telecommunication System
UPF User Plane Function
URLLC Ultra-Reliable Low-Latency Communications
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for operation with shared spectrum channel access, wherein a first plurality of fixed frame periods (FFPs) are associated with the wireless device and a second plurality of fixed frame periods (FFPs) are associated with a network node and wherein each FFP comprises an idle period with no transmission and a channel occupancy time (COT) in which the wireless device or the network node is permitted to transmit, the method comprising:

receiving a Downlink Control Information (DCI) signal indicating that the wireless device may initiate a COT;

based on the DCI signal, initiating the COT in one of the FFPs of the first plurality of FFPs; and upon successful initiation of the COT, transmitting, to the network node, uplink data from the beginning of the COT.

2. The method of claim 1, wherein the DCI signal indicates that wireless device-initiated COT behavior is enabled.

3. The method of claim 1, wherein the first plurality of FFPs and the second plurality of FFPs are not aligned in the time domain and transmitting uplink data comprises refraining from transmitting uplink data in an idle period of any of the FFPs of the second plurality of FFPs.

4. The method of claim 1, wherein the first plurality of FFPs and the second plurality of FFPs are not aligned in the time domain and transmitting uplink data comprises segmenting the uplink data into two or more segments and refraining from transmitting any of the two or more segments that overlap with an idle period of any of the FFPs of the second plurality of FFPs.

5. The method of claim 1, wherein the first plurality of FFPs and the second plurality of FFPs are not aligned in the time domain and transmitting uplink data comprises segmenting the uplink data into two or more segments and refraining from transmitting all of the two or more segments if any of the two or more segments overlap with an idle period of any of the FFPs of the second plurality of FFPs.

6. The method of claim 1, wherein the first plurality of FFPs and the second plurality of FFPs are not aligned in the time domain and transmitting uplink data comprises segmenting the uplink data into two or more segments and refraining from transmitting any of the two or more segments after one of the two or more segments overlap with an idle period of any of the FFPs of the second plurality of FFPs.

7. The method of claim 1, wherein transmitting uplink data comprises segmenting the uplink data into two or more segments and one segment of the two or more segments includes an indication that the wireless device will transmit the next segment of the two or more segments using wireless device initiated COT in a next FFP of the first plurality of FFPs.

8. A wireless device operable to operate in shared spectrum channel access, wherein a first plurality of fixed frame periods (FFPs) are associated with the wireless device and a second plurality of fixed frame periods (FFPs) are associated with a network node and wherein each FFP comprises an idle period with no transmission and a channel occupancy time (COT) in which the wireless device or the network node is permitted to transmit, the wireless device comprising processing circuitry operable to:

receive a Downlink Control Information (DCI) signal indicating that the wireless device may initiate a COT;

based on the DCI signal, initiate the COT in one of the FFPs of the first plurality of FFPs; and upon successful initiation of the COT, transmit uplink data from the beginning of the COT.

9. The wireless device of claim 8, wherein the DCI signal indicates that wireless device-initiated COT behavior is enabled.

10. The wireless device of claim 8, wherein the first plurality of FFPs and the second plurality of FFPs are not aligned in the time domain and the processing circuitry is operable to transmit uplink data by refraining from transmitting uplink data in an idle period of any of the FFPs of the second plurality of FFPs.

11. The wireless device of claim 8, wherein the first plurality of FFPs and the second plurality of FFPs are not aligned in the time domain and the processing circuitry is operable to transmit uplink data by segmenting the uplink data into two or more segments and refraining from transmitting any of the two or more segments that overlap with an idle period of any of the FFPs of the second plurality of FFPs.

12. The wireless device of claim 8, wherein the first plurality of FFPs and the second plurality of FFPs are not aligned in the time domain and the processing circuitry is operable to transmit uplink data by segmenting the uplink data into two or more segments and refraining from transmitting all of the two or more segments if any of the two or more segments overlap with an idle period of any of the FFPs of the second plurality of FFPs.

13. The wireless device of claim 8, wherein the first plurality of FFPs and the second plurality of FFPs are not aligned in the time domain and the processing circuitry is operable to transmit uplink data by segmenting the uplink data into two or more segments and refraining from transmitting any of the two or more segments after one of the two or more segments overlap with an idle period of any of the FFPs of the second plurality of FFPs.

14. The wireless device of claim 8, wherein the processing circuitry is operable to transmit uplink data by segmenting the uplink data into two or more segments and one segment of the two or more segments includes an indication that the wireless device will transmit the next segment of the two or more segments using wireless device initiated COT in a next FFP of the first plurality of FFPs.

15. The wireless device of claim 8, the processing circuitry further operable to:
- determine the wireless device does not have uplink data to transmit at the beginning of a COT; and
- transmit at the beginning of the COT an indication to a base station that the wireless device does not have uplink data to transmit.

16. The wireless device of claim 8, the processing circuitry further operable to signal to another wireless device or network node whether the wireless device was successfully able to obtain a COT for wireless device initiated COT.

17. A method performed by network node for operation with shared spectrum channel access, wherein a first plurality of fixed frame periods (FFPs) are associated with a wireless device and a second plurality of fixed frame periods (FFPs) are associated with the network node and wherein each FFP comprises an idle period with no transmission and a channel occupancy time (COT) in which the wireless device or the network node is permitted to transmit, the method comprising:
- transmitting a Downlink Control Information (DCI) signal indicating that the wireless device may initiate a COT;
- determining that the wireless device initiated the COT in one of the FFPs of the second plurality of FFPs; and
- receiving uplink data from the beginning of the COT.

18. A network node operable to operate in shared spectrum channel access, wherein a first plurality of fixed frame periods (FFPs) are associated with a wireless device and a second plurality of fixed frame periods (FFPs) are associated with the network node and wherein each FFP comprises an idle period with no transmission and a channel occupancy time (COT) in which the wireless device or the network node is permitted to transmit, the network node comprising processing circuitry operable to:
- transmit a Downlink Control Information (DCI) signal indicating that the wireless device may initiate a COT;
- determine that the wireless device initiated the COT in one of the FFPs of the second plurality of FFPs; and
- receive uplink data from the beginning of the COT.

19. The network node of claim 18, wherein the DCI signal indicates that wireless device-initiated COT behavior is enabled.

20. The network node of claim 18, wherein the first plurality of FFPs and the second plurality of FFPs are not aligned in the time domain and uplink data is not received in an idle period of any of the FFPs of the second plurality of FFPs.

21. Network node of claim 18, wherein the first plurality of FFPs and the second plurality of FFPs are not aligned in the time domain and when receiving the uplink data, the processing circuitry is operable to receive two or more segments of the uplink data when the two or more segments do not overlap with an idle period of any of the FFPs of the second plurality of FFPs.

22. The network node of claim 18, wherein the first plurality of FFPs and the second plurality of FFPs are not aligned in the time domain and when receiving the uplink data, the processing circuitry is operable to receive two or more segments of the uplink data when none of the two or more segments overlap with an idle period of any of the FFPs of the second plurality of FFPs.

23. The network node of claim 18, wherein the first plurality of FFPs and the second plurality of FFPs are not aligned in the time domain and when receiving the uplink data, the processing circuitry is operable to receive two or more segments of the uplink data before any overlap with an idle period of any of the FFPs of the second plurality of FFPs.

24. The network node of claim 18, wherein when receiving the uplink data the processing circuitry is operable to receive two or more segments of uplink data, and one segment of the two or more segments includes an indication that the wireless device will transmit the next segment of the two or more segments using wireless device initiated COT in a next FFP of the first plurality of FFPs.

25. The network node of claim 18, wherein when receiving the uplink data the processing circuitry further operable to receive at the beginning of the COT an indication that the wireless device does not have uplink data to transmit.

26. The network node of claim 18, the processing circuitry further operable to signal to another wireless device or network node whether the wireless device was successfully able to obtain a COT for wireless device initiated COT.

* * * * *